United States Patent
Minami et al.

(10) Patent No.: US 11,661,478 B2
(45) Date of Patent: May 30, 2023

(54) MAGNETIC RECORDING MEDIUM, FLUORINE-CONTAINING ETHER COMPOUND AND LUBRICANT FOR MAGNETIC RECORDING MEDIUM

(71) Applicant: SHOWA DENKO K.K., Tokyo (JP)

(72) Inventors: Takuya Minami, Chiba (JP); Yoshishige Okuno, Chiba (JP); Yuta Yamaguchi, Kawasaki (JP); Ryuuta Miyasaka, Funabashi (JP); Naoya Fukumoto, Ichihara (JP); Hiroko Hattori, Tokyo (JP); Hiroyuki Tomita, Ichihara (JP); Michio Seri, Ichihara (JP); Naoko Ito, Tokorozawa (JP); Ichiro Ota, Chiba (JP); Katsumi Murofushi, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 749 days.

(21) Appl. No.: 16/489,931

(22) PCT Filed: Feb. 6, 2018

(86) PCT No.: PCT/JP2018/003967
§ 371 (c)(1),
(2) Date: Aug. 29, 2019

(87) PCT Pub. No.: WO2018/159232
PCT Pub. Date: Sep. 7, 2018

(65) Prior Publication Data
US 2020/0010619 A1      Jan. 9, 2020

(30) Foreign Application Priority Data
Mar. 2, 2017 (JP) .............................. JP2017-039816

(51) Int. Cl.
*C08G 65/331*       (2006.01)
*C08G 65/333*       (2006.01)
(Continued)

(52) U.S. Cl.
CPC ......... *C08G 65/331* (2013.01); *C08G 65/333* (2013.01); *C10M 107/38* (2013.01); *G11B 5/7257* (2020.08); *C10N 2040/18* (2013.01)

(58) Field of Classification Search
CPC .... G11B 5/725; C08G 65/331; C08G 65/333; C10M 107/38; C10N 2040/18
See application file for complete search history.

(56) References Cited

U.S. PATENT DOCUMENTS

| 4,421,795 A | 12/1983 | Davies |
| 2011/0026162 A1 | 2/2011 | Hamakubo et al. |

(Continued)

FOREIGN PATENT DOCUMENTS

| EP | 1 712 580 A1 | 10/2006 |
| JP | 61-004727 A | 1/1986 |

(Continued)

OTHER PUBLICATIONS

Notice of Reasons for Rejection dated Sep. 7, 2021, issued by the Japanese Patent Office in application No. 2019-502835.

(Continued)

*Primary Examiner* — Holly Rickman
(74) *Attorney, Agent, or Firm* — Sughrue Mion, PLLC

(57) ABSTRACT

A fluorine-containing ether compound of the present invention is represented by the following General Formula (1). (In the General Formula (1), X is a trivalent atom or a trivalent atom group, A is a linking group including at least one polar group, B is a linking group having a perfluoropolyether chain, and D is a polar group or a substituent having a polar group at the end.)

[Chem. 1]

$$X\text{-}(A\text{-}B\text{-}D)_3 \qquad (1)$$

7 Claims, 3 Drawing Sheets

(51) Int. Cl.
    *C10M 107/38*      (2006.01)
    *G11B 5/725*      (2006.01)
    *C10N 40/18*      (2006.01)

(56) References Cited

U.S. PATENT DOCUMENTS

| | | |
|---|---|---|
| 2012/0002323 A1 | 1/2012 | Kato et al. |
| 2012/0201962 A1 | 8/2012 | Kawata et al. |
| 2012/0315504 A1 | 12/2012 | Shimizu et al. |

FOREIGN PATENT DOCUMENTS

| | | |
|---|---|---|
| JP | 2005-047880 A | 2/2005 |
| JP | 3811880 B2 | 8/2006 |
| JP | 2006-290892 A | 10/2006 |
| JP | 2010-143855 A | 7/2010 |
| JP | 2010-218659 A | 9/2010 |
| JP | 2010-248463 A | 11/2010 |
| JP | 2012-184339 A | 9/2012 |
| JP | 2013-18961 A | 1/2013 |
| JP | 2013-544311 A | 12/2013 |
| WO | 98/55464 A1 | 12/1998 |
| WO | 2009/123037 A1 | 10/2009 |
| WO | 2010/038754 A1 | 4/2010 |
| WO | 2010/150816 A1 | 12/2010 |
| WO | 2012/072532 A1 | 6/2012 |
| WO | 2013/054393 A1 | 4/2013 |
| WO | 2015/093237 A1 | 6/2015 |

OTHER PUBLICATIONS

International Search Report for PCT/JP2018/003967 dated May 1, 2018 [PCT/ISA/210].
The Second Office Action dated May 6, 2022 from the China National Intellectual Property Administration in CN Application No. 201880014817.0.

MAGNETIC RECORDING MEDIUM, FLUORINE-CONTAINING ETHER COMPOUND AND LUBRICANT FOR MAGNETIC RECORDING MEDIUM

CROSS REFERENCE TO RELATED APPLICATIONS

This application is a National Stage of International Application No. PCT/JP2018/003967, filed on Feb. 6, 2018, claiming priority based on Japanese Patent Application No. 2017-039816, filed on Mar. 2, 2017, the contents of which are incorporated herein by reference.

TECHNICAL FIELD

The present invention relates to a magnetic recording medium, a fluorine-containing ether compound and a lubricant for a magnetic recording medium.

BACKGROUND ART

The development of magnetic recording media suitable for a high recording density is progressing in order to improve a recording density of magnetic recording and reproducing devices.

In the related art, regarding a magnetic recording medium, those in which a recording layer is formed on a substrate, and a protective layer made of carbon or the like is formed on the recording layer, are known. The protective layer protects information recorded in the recording layer and improves the slidability of a magnetic head. However, it is not possible to obtain sufficient durability of a magnetic recording medium by simply providing the protective layer on the recording layer. Therefore, generally, a lubricant is applied to the surface of the protective layer to form a lubricating layer.

Regarding a lubricant used for forming a lubricating layer of a magnetic recording medium, for example, a lubricant containing a compound having a polar group such as a hydroxyl group at an end of a fluorinated polymer having a repeating structure including $CF_2$, has been proposed (for example, refer to Patent Documents 1 to 3).

CITATION LIST

Patent Literature

[Patent Document 1]
Japanese Unexamined Patent Application, First Publication No. 2010-248463
[Patent Document 2]
Japanese Unexamined Patent Application, First Publication No. 2012-184339
[Patent Document 3]
PCT International Publication No. WO 2013/054393
[Patent Document 4]
PCT International Publication No. WO 2010/038754
[Patent Document 5]
Japanese Patent No. 3811880

SUMMARY OF INVENTION

Technical Problem

In a magnetic recording and reproducing device, it is required to further reduce a flying height of the magnetic head. Therefore, it is required to further reduce the thickness of the lubricating layer in a magnetic recording medium.

However, when the thickness of the lubricating layer is thin, gaps are easily formed in the lubricating layer. As a result, the coverage of the lubricating layer covering the surface of the protective layer is reduced. When environmental substances that generate contaminants enter a layer below the lubricating layer through gaps in the lubricating layer having a low coverage, the environmental substances generate contaminants such as ionic impurities that contaminate the magnetic recording medium.

The present invention has been made in view of the above circumstances, and an objective of the present invention is to provide a fluorine-containing ether compound, suitably used as a material for a lubricant for a magnetic recording medium that can form a lubricating layer, which can cover the surface of a protective layer with a high coverage even if the thickness thereof is thin.

In addition, an objective of the present invention is to provide a lubricant for a magnetic recording medium using the fluorine-containing ether compound of the present invention and a magnetic recording medium using the same.

Solution to Problem

In order to solve the above problems, the inventors conducted extensive studies.

As a result, it has been found that it is sufficient that a fluorine-containing ether compound be applied, in which three fluorine-containing ether groups are connected to a trivalent atom or a trivalent atom group X disposed at the center, and regarding the three fluorine-containing ether groups, a linking group A including at least one polar group, a linking group B having a perfluoropolyether chain, and a polar group or a substituent D having a polar group at the end are disposed in this order from the side of the trivalent atom or the trivalent atom group X.

In the above fluorine-containing ether compound, when a lubricant containing a fluorine-containing ether compound is applied to a protective layer of the magnetic recording medium, linking groups B having a perfluoropolyether chain that extend in three directions from the trivalent atom or the trivalent atom group X cover the surface of the protective layer and reduce a frictional force between the magnetic head and the protective layer. In addition, the polar groups of the linking group A and the substituent D cause the lubricant and the protective layer to adhere when a lubricant containing the fluorine-containing ether compound is applied to the protective layer of the magnetic recording medium.

In such a fluorine-containing ether compound, when a lubricating layer is formed on the protective layer using a lubricant containing the same, the trivalent atom or the trivalent atom group X disposed at the center adheres to the protective layer according to bonding between three linking groups A disposed in the vicinity of the trivalent atom or the trivalent atom group X and the protective layer. In addition, ends of three fluorine-containing ether groups connected to the trivalent atom or the trivalent atom group X each adhere to the protective layer according to bonding between the substituent D and the protective layer.

As a result, the linking groups B, having a perfluoropolyether chain, extend from the trivalent atom or the trivalent atom group X in three directions and are bonded at both ends to the protective layer via the linking group A and the substituent D.

Therefore, in the lubricating layer formed on the protective layer using a lubricant containing the above fluorine-containing ether compound, the linking group B is disposed on the protective layer so that it extends in the surface direction. Moreover, in such a lubricating layer, since both ends of the linking group B are bonded to the protective layer via the linking group A and the substituent D, the lubricating layer and the protective layer are firmly bonded. Accordingly, in a lubricant containing the above fluorine-containing ether compound, it is speculated that, it is possible to form a lubricating layer that can cover the surface of the protective layer with a high coverage even if the thickness thereof is thin. Therefore, it is speculated that, when a lubricating layer is formed on the protective layer using a lubricant containing the above fluorine-containing ether compound, it is possible to prevent environmental substances that have entered a layer below the lubricating layer from contaminating the magnetic recording medium.

Thus, the inventors conducted a simulation on the assumption that a lubricating layer is formed on a protective layer of a magnetic recording medium using a lubricant containing the above fluorine-containing ether compound, and examined the relationship between the film thickness and the coverage of the lubricating layer and pollution (contamination) of the magnetic recording medium. As a result, it was found that, even if the thickness thereof is thin, the lubricating layer formed on the protective layer using a lubricant containing the above fluorine-containing ether compound can cover the surface of the protective layer with a high coverage and can reduce contamination of the magnetic recording medium, In addition, the inventors produced an actual lubricant containing the above fluorine-containing ether compound, formed a lubricating layer on a protective layer of a magnetic recording medium using the same, and examined the relationship between the film thickness and the coverage of the lubricating layer and pollution (contamination) of the magnetic recording medium. As a result, they confirmed that the relationships were highly correlated with simulation results.

According to the above examination, the present invention shown below has been completed.

[1] A fluorine-containing ether compound according to an embodiment of the present invention is represented by the following General Formula (1):

[Chem. 1]

(in the General Formula (1), X is a trivalent atom or a trivalent atom group, A is a linking group including at least one polar group, B is a linking group having a perfluoropolyether chain, and D is a polar group or a substituent having a polar group at the end).

[2] In the fluorine-containing ether compound according to [1], preferably, X in the General Formula (1) is a hydrocarbon.

[3] In the fluorine-containing ether compound according to [1], preferably, X in the General Formula (1) is an aliphatic ring.

[4] In the fluorine-containing ether compound according to [1], preferably, X in the General Formula (1) is an aromatic ring.

[5] In the fluorine-containing ether compound according to [1], preferably, X in the General Formula (1) is a heterocyclic ring.

[6] In the fluorine-containing ether compound according to [1], preferably, X in the General Formula (1) is a trivalent atom group having a tetrahedron structure including a carbon atom at the center or a trivalent atom group having a cyclic planar structure at the center.

[7] In the fluorine-containing ether compound according to any one of [1] to [6], preferably, A in the General Formula (1) is a linking group including at least one hydroxyl group.

[8] In the fluorine-containing ether compound according to any one of [1] to [7], preferably, A in the General Formula (1) is a linking group represented by any of the following General Formula (2) to the following General Formula (4).

[Chem. 2]

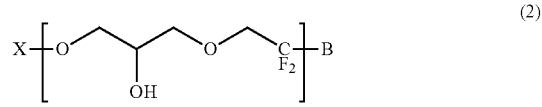

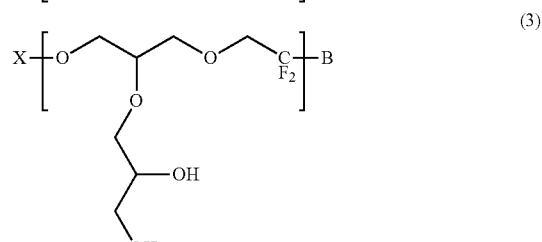

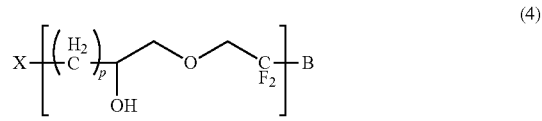

(in the General Formula (4), p is an integer of 1 to 5).

[9] In the fluorine-containing ether compound according to any one of [1] to [8], preferably, B in the General Formula (1) is a linking group represented by the following General Formula (5) or the following General Formula (6).

[Chem. 3]

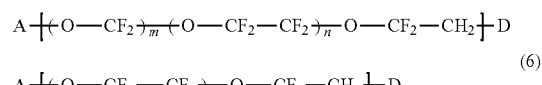

(in the General Formula (5), m is an integer of 1 to 30, and n is an integer of 1 to 30), (in the General Formula (6), q is an integer of 1 to 30).

[10] In the fluorine-containing ether compound according to any one of [1] to [9], preferably, D in the General Formula (1) represents a hydroxyl group or any of the following General Formulae (7-1) to (7-3).

[Chem. 4]

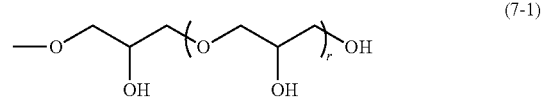

(7-2)
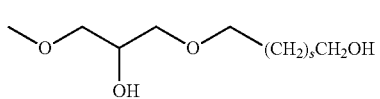
(7-3)
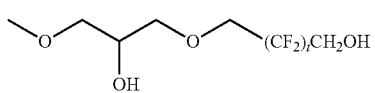
(in the General Formula (7-1), r is an integer of 0 to 5),
(in the General Formula (7-2), s is an integer of 0 to 5),
(in the General Formula (7-3), t is an integer of 1 to 5).
[11] In the fluorine-containing ether compound according to [1], preferably, X in the General Formula (1) is represented by any one of the following General Formula (8) to the following General Formula (23),
[Chem. 5]
(8)
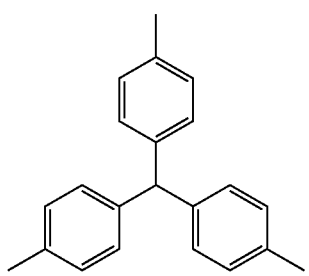
(9)
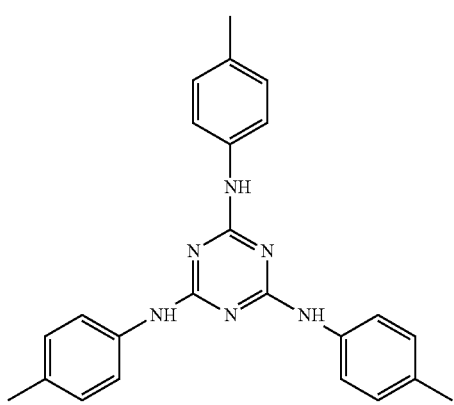
(10)
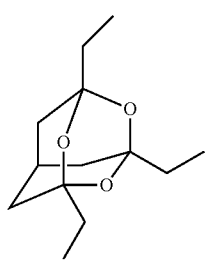
(11)
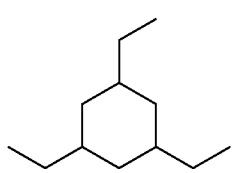
(12)
(13)
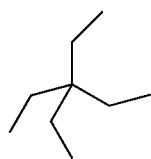
(14)
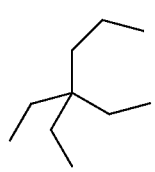
(15)
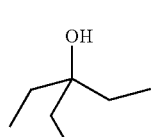
(16)
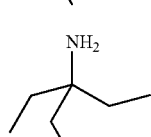
[Chem. 6]
(17)
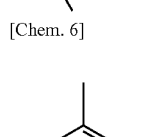
(18)
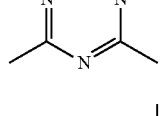
(19)
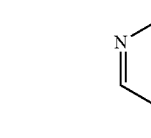
(20)
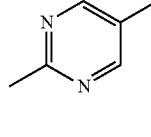

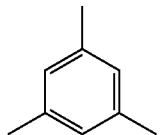

(21)

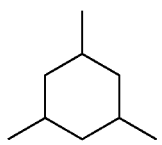

(22)

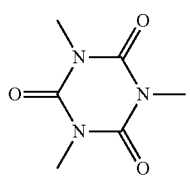

(23)

[12] In the fluorine-containing ether compound according to any one of [1] to [11], preferably, the number-average molecular weight is in a range of 1,000 to 10,000.

[13] A lubricant for a magnetic recording medium according to an embodiment of the present invention includes the fluorine-containing ether compound according to any one of [1] to [12].

[14] A magnetic recording medium according to an embodiment of the present invention is a magnetic recording medium in which at least a magnetic layer, a protective laser, and a lubricating layer are sequentially provided on a substrate, and the lubricating layer includes the fluorine-containing ether compound according to any one of [1] to [12].

[15] In the magnetic recording medium according to [14], preferably, the average film thickness of the lubricating layer is 0.5 nm to 3 nm.

Advantageous Effects of Invention

The fluorine-containing ether compound of the present invention is a compound represented by the General Formula (1) and is suitable as a material for a lubricant for a magnetic recording medium. Since the lubricant for a magnetic recording medium of the present invention contains a fluorine-containing ether compound of the present invention, it is possible to form a lubricating layer that can cover the surface of the protective layer with a high coverage even if the thickness thereof is thin, and it is possible to reduce contamination of the magnetic recording medium.

DESCRIPTION OF EMBODIMENTS

Figure 1:
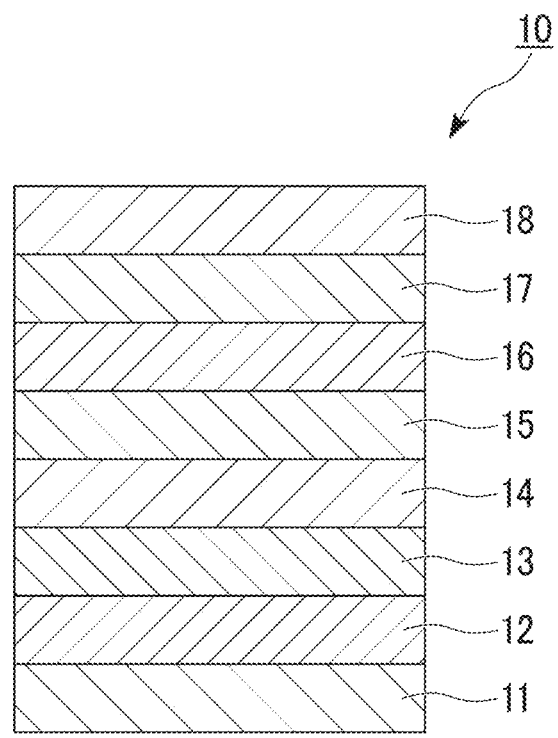
FIG. 1 is a schematic cross-sectional view showing an embodiment of a magnetic recording medium of the present invention.

Preferable embodiments of a fluorine-containing ether compound, a lubricant for a maanetic recording medium and a magnetic recording medium of the present invention will be described below in detail. Here, the present invention is not limited to the following embodiments. Unless otherwise specified, numbers, positions, materials and the like may be selected as necessary.

[Fluorine-Containing Ether Compound]

A fluorine-containing ether compound of the present embodiment (an ether compound containing fluorine) is represented by the General Formula (1).

In the General Formula (1), X represents a trivalent atom or a trivalent atom group. The trivalent atom or the trivalent atom group X functions as a linking group that links three fluorine-containing ether groups in which a linking group A, a linking group B, and a substituent D are disposed in this order from the side of the trivalent atom or the trivalent atom group X.

The trivalent atom or the trivalent atom group X is not particularly limited, and examples thereof include any of those represented by the General Formula (8) to the General Formula (23). The trivalent atom or the trivalent atom group X is appropriately selected according to the performance required for the lubricant of the present embodiment.

The trivalent atom or the trivalent atom group X is preferably a hydrocarbon. Regarding such a trivalent atom or trivalent atom group X, those represented by the General Formulae (12) to (14) are particularly preferable.

The trivalent atom or the trivalent atom group X is preferably an aliphatic ring. Regarding such a trivalent atom or trivalent atom group X, those represented by the General Formulae (10), (11), (19), (20), and (22) are particularly preferable.

The trivalent atom or the trivalent atom group X is preferably an aromatic ring. Regarding such a trivalent atom or trivalent atom group X, those represented by the General Formula (21) are particularly preferable.

The trivalent atom or the trivalent atom group X is preferably a heterocyclic ring. Regarding such a trivalent atom or trivalent atom group X, those represented by the General Formulae (9), (17), and (23) are particularly preferable.

The trivalent atom or the trivalent atom group X is preferably a trivalent atom group having a tetrahedron structure (SP3 structure) including a carbon atom at the center or a trivalent atom group having a cyclic planar structure at the center.

Regarding a trivalent atom group having a tetrahedron structure (SP3 structure) including a carbon atom at the center, those represented by the General Formulae (8) and (12) to (16), (18), and (19) are particularly preferable.

Regarding a trivalent atom group having a cyclic planar structure at the center, those represented by the General Formulae (17) and (23) are particularly preferable.

The linking group A including at least one polar group in the General Formula (1) contributes to adhesion between a protective layer to which a lubricant containing a. fluorine-containing ether compound of the present embodiment is applied and a lubricating layer formed by applying a lubricant. The polar group included in the linking group A is not particularly limited, and examples thereof include a hydroxyl group, a carboxyl group, an amino group, and an aminocarboxyl group. The linking group A is preferably a linking group including at least one hydroxyl group. If the polar group included in the linking group A is a hydroxyl group, when a protective layer to which a lubricant is applied is formed of carbon or carbon containing nitrogen, adhesion between the protective layer and the lubricant containing a fluorine-containing ether compound is further improved.

The linking group including at least one hydroxyl group is preferably a linking group represented by the General Formula (2) to the General Formula (4). When the linking group A is a linking group represented by the General Formula (2) to the General Formula (4), adhesion between the protective layer to which a lubricant is applied and the linking group A is further improved. In addition, if the linking group A is a linking group represented by the General Formula (2) to the General Formula (4), a fluorine-containing ether compound is easily synthesized, which is preferable.

In the General Formula (4), p is an integer of 1 to 5. When p is an integer of 1 to 5, the distance between the trivalent atom or the trivalent atom group X and the hydroxyl group included in the linking group A is not too long. Therefore, the trivalent atom or the trivalent atom group X is more firmly adhered to the protective layer by a bond between the linking group A and the protective layer, which is preferable. More preferably, p is an integer of 2 to 4. p is appropriately determined according to the performance required for the lubricant of the present embodiment.

With the linking group B having a perfluoropolyether chain in the General Formula (1), when a lubricant containing a fluorine-containing ether compound is applied to a protective layer to form a lubricating layer, the surface of the protective layer is covered, lubricity is imparted to the lubricating layer, and the frictional force between the magnetic head and the protective layer is reduced.

The linking group B having a perfluoropolyether chain is not particularly limited, and examples thereof include linking groups represented by the General Formula (5) or the General Formula (6). The linking group B having a perfluoropolyether chain has a more rigid framework as the number of oxygen atoms with respect to the number of carbon atoms in the perfluoropolyether chain becomes smaller.

The linking group represented by the General Formula (5) or the General Formula (6) has an appropriate number of oxygen atoms (the number of ether bonds (—O—)) included in the perfluoropolyether chain. Therefore, when the linking group B is a linking group represented by the General Formula (5) or the General Formula (6), a fluorine-containing ether compound having appropriate hardness is obtained. Therefore, the linking group B in the fluorine-containing ether compound applied to the protective layer is less likely to aggregate on the protective layer and a lubricating layer having a thin thickness can be formed, In the General Formula (5), m is an integer of 1 to 30, and n is an integer of 1 to 30. In the General Formula (5), an arrangement sequence of repeating units (O—$CF_2$) and (O—$CF_2$—$CF_2$) is not particularly limited. In the General Formula (5), the number m of (O—$F_2$)'s and the number n of (O—$CF_2$—$CF_2$)'s may be the same as or different from each other. That is, the General Formula (5) may include any of a random copolymer, a block copolymer, and an alternating copolymer composed of monomer units (O—$CF_2$) and (O—$CF_2$—$CF_2$).

In the General Formula (5), if m is an integer of 1 to 30 and n is an integer of 1 to 30, a number-average molecular weight of a fluorine-containing ether compound of the present embodiment is likely to be in a preferable range, which is preferable. m is preferably an integer of 2 to 20, more preferably an integer of 2 to 10, and most preferably an integer of 2 to 5. n is preferably an integer of 2 to 20, is more preferably an integer of 2 to 10, and is most preferably an integer of 2 to 5.

In the General Formula (6), if q is an integer of 1 to 30, the number-average molecular weight of a fluorine-containing ether compound of the present embodiment is likely to be in a preferable range, which is preferable. q is more preferably an integer of 2 to 20 and most preferably an integer of 3 to 7.

The polar group or the substituent D having a polar group at the end in the General Formula (1) contributes to adhesion between the protective layer to which a lubricant containing a fluorine-containing ether compound of the present embodiment is applied and the lubricating layer formed by applying a lubricant.

The polar group included in the substituent D is not particularly limited, and examples thereof include a hydroxyl group, a carboxyl group, an amino group, and an aminocarboxyl group. The number of polar groups included in the substituent D is not particularly limited, and may be one or more. The number of polar groups included in the substituent D is preferably 2 or more in order to improve the effect of improving adhesion by the substituent D.

The substituent D preferably includes at least one hydroxyl group. If the polar group included in the substituent D is a hydroxyl group, when the protective layer to which a lubricant is applied is formed of carbon or silicon carbide, adhesion between the protective layer and the lubricant containing a fluorine-containing ether compound is further improved.

The substituent D is not particularly limited, and examples thereof include a hydroxyl group, and any of those represented by the General Formulae (7-1) to (7-3). When the substituent D is a hydroxyl group or any of those represented by the General Formulae (7-1) to (7-3), adhesion between the protective layer to which a lubricant is applied and the substituent D is further improved.

In the General Formula. (7-1), if r is an integer of 0 to 5, adhesion between the protective layer and the substituent D becomes more favorable and it is possible to prevent the number-average molecular weight of the fluorine-containing ether compound from becoming too large, which is preferable. r is more preferably an integer of 0 to 2.

In the General Formula (7-2), ifs is an integer of 0 to 5, adhesion between the protective layer and the substituent D becomes more favorable and it is possible to prevent the number-average molecular weight of the fluorine-containing ether compound from becoming too large, which is preferable. s is more preferably an integer of 0 to 2.

In the General Formula (7-3), if t is an integer of 1 to 5, adhesion between the protective layer and the substituent I) becomes more favorable and it is possible to prevent the number-average molecular weight of the fluorine-containing ether compound from becoming too large, which is preferable. t is more preferably an integer of 1 to 2.

The number-average molecular weight of the fluorine-containing ether compound of the present embodiment is preferably in a range of 1,000 to 10,000. When the number-average molecular weight is 1,000 or more, a lubricant containing a fluorine-containing ether compound of the present embodiment is unlikely to evaporate, and it is possible to prevent the lubricant from evaporating and an evaporated lubricant from adhering to the magnetic head. In addition, if the number-average molecular weight is 1,000 or more, a proportion of the linking group B having a perfluoropolyether chain contained in the fluorine-containing ether compound is sufficiently high, and thus it is possible to form a lubricating layer having excellent lubricity, which is preferable. The number-average molecular weight of the fluorine-containing ether compound is more preferably 2,000 or more. In addition, when the number-average molecular weight is 10,000 or less, the viscosity of the fluorine-containing ether compound becomes appropriate and when a lubricant containing the same is applied, it is possible to easily form a lubricating layer having a thin thickness. The number-average molecular weight of the fluorine-containing ether compound is preferably 4,000 or less because the viscosity is suitable for handling when applied to a lubricant.

The number-average molecular weight can be obtained through gel permeation chromatography (GPC). The measurement conditions of GPC are as follows. Column: KF803 commercially available from Shodex
Eluent: fluorinated solvent (product name: Asahiklin AK-225, commercially available from AGC Inc,)/acetone=4/1(v/v)
Flow rate: 1 mL/min
Detector: ELSD (evaporative light scattering detector)

A method of producing a fluorine-containing ether compound of the present embodiment is not particularly limited. The fluorine-containing ether compound of the present embodiment can be produced using a production method known in the related art, and for example, the production method shown below can be used. First, a trifunctional epoxy compound having an epoxy group at the end of the position to which the linking group A is bonded for the trivalent atom or the trivalent atom group X, is synthesized. Next, according to a ring-opening addition reaction of the epoxy groups included in the synthesized trifunctional epoxy compound, a fluorine-containing ether compound of the present embodiment can be produced by a method such as adding a fluoropolyether having a structure corresponding to the linking group B having a perfluoropolyether chain and the substituent D.

In the above production method, a trifunctional epoxy compound having an epoxy group at the end of the position to which the linking group A is bonded for the trivalent atom or the trivalent atom group X, may be synthesized or a commercially available compound may be used.

For example, when the trivalent atom or the trivalent atom group X is any of those represented by the General Formula (8) to the General Formula (22), the trifunctional epoxy compound is preferably synthesized using a compound in which a hydroxyl group is bonded to a position at which the linking group A for the trivalent atom or the trivalent atom group X is bonded, as a material. Specifically, according to a known method in the related art, by using the above compound in which a hydroxyl group is bonded as a material, a trifunctional epoxy compound having an epoxy group at the end of the position to which the hydroxyl group was bonded is synthesized.

The fluorine-containing ether compound of the present embodiment is a compound represented by the General Formula (1).

Therefore, when a lubricating layer is formed on a protective layer using a lubricant containing the same, the trivalent atom or the trivalent atom group X disposed at the center adheres to the protective layer according to bonding between three linking groups A, disposed in the vicinity of the trivalent atom or the trivalent atom group X, and the protective layer. In addition, ends of three fluorine-containing ether groups, connected to the trivalent atom or the trivalent atom group X, are adhered to the protective layer according to bonding between the substituent D and the protective layer As a result, the linking group B, having a perfluoropolyether chain, extends from the trivalent atom or the trivalent atom group X in three directions and are bonded to the protective layer at both ends via the linking group A and the substituent D.

Therefore, in the lubricating layer formed on the protective layer using a lubricant containing the above fluorine-containing ether compound, the linking group B is disposed on the protective layer so that it extends in the surface direction. Moreover, in such a lubricating layer, since both ends of the linking group B are bonded to the protective layer via the linking group A and the substituent D, the lubricating layer and the protective layer are firmly bonded. Accordingly, in the lubricant containing the above fluorine-containing ether compound, even if the thickness thereof is thin, it is possible to form a lubricating layer that can cover the surface of the protective layer with a high coverage. Therefore, when a lubricating layer is formed on the protective layer using the lubricant containing the above fluorine-containing ether compound, it is possible to prevent environmental substances that have entered a layer below the lubricating layer from contaminating the magnetic recording medium.

On the other hand, for example, when a compound having no linking group A and/or substituent D is used as a fluorine-containing ether compound, if the thickness of the lubricating layer formed on the protective layer is thin, a sufficient coverage is not obtained. It is speculated that, when the linking group A and/or the substituent D is not provided, the linking group B is likely to aggregate on the protective layer in the thickness direction of the protective layer and is unlikely to extend on the protective layer in the surface direction. In addition, when the linking group A and/or the substituent D is not provided, adhesion to the protective layer becomes insufficient if the thickness of the lubricating layer is thin, and so it is difficult to reduce the thickness.

[Lubricant for a Magnetic Recording Medium]

The lubricant of the present embodiment for a magnetic recording medium (hereinafter abbreviated as a "lubricant" in some cases) includes a fluorine-containing ether compound represented by the General Formula (1).

In the lubricant of the present embodiment, other known fluorine-containing ether compounds used as a lubricant may be contained as long as the characteristics of including a fluorine-containing ether compound represented by the General Formula (1) are not impaired.

Examples of the other fluorine-containing ether compound include a fluorine-containing ether compound having a hydroxyl group at the end and a fluorine-containing ether compound having other functional groups of the polar group.

In the lubricant of the present embodiment, other lubricants that do not contain the fluorine-containing ether compound represented by the General Formula (1) can be used by being mixed as necessary. Specific examples of other lubricants include FOMBLIN (registered trademark) ZDIAC, FOMBLIN ZDEAL, FOMBLIN AM-2001(all are commercially available from Solvey Solexis and Moresco A20H (commercially available from Moresco). Regarding other lubricants, those having a number-average molecular weight of 1,000 to 10,000 are preferably used.

When the lubricant of the present embodiment contains another lubricant, a content of the fluorine-containing ether compound represented by the General Formula (1) in the lubricant of the present embodiment is preferably 50 mass % or more and more preferably 70 mass % or more.

Since the lubricant of the present embodiment contains the fluorine-containing ether compound represented by the General Formula (1), even if the thickness thereof is thin, it is possible to form a lubricating layer that can cover the surface of the protective layer with a high coverage and it is possible to reduce contamination of the magnetic recording medium. Therefore, according to the lubricant of the present embodiment, it is possible to provide a magnetic recording medium with few contaminants present on the surface.

[Magnetic Recording Medium]

FIG. 1 is a schematic cross-sectional view showing an embodiment of a magnetic recording medium of the present invention.

A magnetic recording medium 10 of the present embodiment has a structure in which an adhesion layer 12, a soft magnetic layer 13, a first underlayer 14, a second underlayer 15, a magnetic layer 16, a protective layer 17, and a lubricating layer 18 are sequentially provided on a substrate 11.

"Substrate"

Regarding the substrate 11, for example, a nonmagnetic substrate in which a film made of NiP or a NiP alloy is formed on a base made of a metal or an alloy material such as Al or an Al alloy can be used.

In addition, regarding the substrate 11, a nonmagnetic substrate made of a non-metallic material such as glass, a ceramic, silicon, silicon carbide, carbon, or a resin may be used, and a nonmagnetic substrate in which a film made of NiP or a NiP alloy is formed on a base made of such a non-metallic material may be used.

"Adhesion Layer"

The adhesion layer 12 prevents the corrosion of the substrate 11 from progressing, when it is disposed in contact with the substrate 11 and the soft magnetic layer 13 provided on the adhesion layer 12.

The material of the adhesion layer 12 can be appropriately selected from, for example, Cr, Cr alloys, Ti, and Ti alloys. The adhesion layer 12 can be formed by, for example, a sputtering method.

"Soft Magnetic Layer"

The soft magnetic layer 13 preferably has a structure in which a first soft magnetic film, an intermediate layer made of a Ru film, and a second soft magnetic film are sequentially laminated. That is, the soft magnetic layer 13 preferably has a structure in which an intermediate layer made of a Ru film is interposed between two soft magnetic film layers, and the soft magnetic films above and below the intermediate layer are bonded via anti-ferro-coupling (AFC). When the soft magnetic layer 13 has an AFC-bonded structure, it is possible to increase the resistance with respect to an external magnetic field, and the resistance with respect to a wide area tack erasure (WATT) phenomenon which is a problem unique to perpendicular magnetic recording.

The first soft magnetic film and the second soft magnetic film are preferably a film made of a CoFe alloy.

When the first soft magnetic film and the second soft magnetic film are a film made of a CoFe alloy, a high saturation magnetic flux density B s(1.4 (T) or more) can be realized.

In addition, any of Zr, Ta, and Nb is preferably added to a CoFe alloy used for the first soft magnetic film and the second soft magnetic film. Therefore, the amorphization of the first soft magnetic film and the second soft magnetic film can be promoted, the orientation of the seed layer can be improved, and the flying height of the magnetic head can be reduced.

The soft magnetic layer 13 can be formed by, for example, a sputtering method.

"First Underlayer"

The first underlayer 14 is a layer for controlling the orientation and crystal size of the second underlayer 15 and the magnetic layer 16 provided thereon. The first underlayer 14 is provided to increase the direction component perpendicular to the surface of the substrate of a magnetic flux generated from the magnetic head and to fix the direction of magnetization of the magnetic layer 16 more firmly to a direction perpendicular to the substrate 11.

The first underlayer 14 is preferably a layer made of a NiW alloy. When the first underlayer 14 is a layer made of a NiW alloy, other elements such as B, Mn, Ru, Pt, Mo, and Ta may be added to the NiW alloy as necessary The first underlayer 14 can be formed by, for example, a sputtering method.

"Second Underlayer"

The second underlayer 15 is a layer that performs control such that the orientation of the magnetic layer 16 becomes favorable. The second underlayer 15 is preferably a layer made of Ru or a Ru alloy.

The second underlayer 15 may be composed of a single layer or a plurality of layers. When the second underlayer 15 is composed of a plurality of layers, all the layers may be made of the same material or at least one layer may be made of different materials.

The second underlayer 15 can be formed by, for example, a sputtering method.

"Magnetic Layer"

The magnetic layer 16 is made of a magnetic film in which the axis of easy magnetization is in a direction perpendicular to the surface of the substrate. The magnetic layer 16 is a layer containing Co and Pt and also may be a layer containing an oxide, Cr, B, Cu, Ta, Zr, or the like in order to further improve SNR characteristics.

Examples of the oxide contained in the magnetic layer 16 include $SiO_2$, $SiO$, $Cr_2O_3$, $CoO$, $Ta_2O_3$, and $TiO_2$.

The magnetic layer 16 may be composed of one layer and may be composed of a plurality of magnetic layers made of materials with different compositions.

For example, when the magnetic layer 16 is composed of three layers including a first maanetic layer, a second magnetic layer, and a third magnetic layer, the first magnetic layer preferably has a granular structure made of a material containing Co, Cr, and Pt and additionally containing an oxide. Regarding the oxide contained in the first magnetic layer, for example, oxides of Cr, Si, Ta, Al, Ti, Mg, Co, and the like, are preferably used. Among these, in particular, $TiO_2$, $Cr_2O_3$, $SiO_2$, and the like can be suitably used. In addition, the first magnetic layer is preferably made of a composite oxide in which two or more types of oxide are added. Among these, in particular, $Cr_2O_3$—$SiO_2$, $Cr_2O_3$—$TiO_2$, $SiO_2$—$TiO_2$ and the like can be suitably used.

The first magnetic layer can contain one or more elements selected from among B, Ta, Mo, Cu, Nd, W, Nb, Sm, Tb, Ru, and Re in addition to Co, Cr, Pt, and an oxide.

When one or rr ore of the above elements are contained, it is possible to promote refinement of magnetic particles or improve the crystallinity and orientation, and obtain recording and reproducing characteristics and thermal fluctuation characteristics suitable for higher density recording.

The same materials as for the first magnetic layer can be used for the second magnetic layer. The second magnetic layer preferably has a granular structure.

The third magnetic layer preferably has a non-granular structure made of a material containing Co, Cr, and Pt and containing no oxide. The third magnetic layer contains one or more elements selected from among B, Ta, Mo, Cu, Nd, W, Nb, Sm, Tb, Ru, Re, and Mn in addition to Co, Cr, and Pt. When the third magnetic layer contains the above elements in addition to Co, Cr, and Pt, it is possible to promote refinement of magnetic particles or improve the crystallinity and orientation, and obtain recording and reproducing characteristics and thermal fluctuation characteristics suitable for higher density recording.

When the magnetic layer 16 is formed of a plurality of magnetic layers, a non-magnetic layer is preferably provided between adjacent magnetic layers. When the magnetic layer 16 is composed of three layers including a first magnetic layer, a second magnetic layer, and a third magnetic layer, a non-magnetic layer is preferably provided between the first magnetic layer and the second magnetic layer, and between the second magnetic layer and the third magnetic layer.

When a non-magnetic layer with an appropriate thickness is provided between adjacent magnetic layers, it is possible to easily invert the magnetization of each film, it is possible to reduce the dispersion of magnetization inversion of all rmagnetic particles, and it is possible to further improve an S/N ratio, For example, Ru, a Ru alloy, a CoCr alloy, a CoCrX1 alloy (X1 is one, two or more elements selected from among Pt, Ta, Zr, Re, Ru, Cu, Nb, Ni, Mn, Ge, Si, O, N, W, Mo, Ti, V, Zr, and B) or the like can be suitably used for the non-magnetic layer provided between adjacent magnetic layers of the magnetic layer 16.

An alloy material containing an oxide, a metal nitride, or a metal carbide is preferably used for the non-magnetic layer provided between adjacent magnetic layers of the magnetic layer 16. Specifically, regarding the oxide, for example, $SiO_2$, $Al_2O_3$, $Ta_2O_5$, $Cr_2O_3$, MgO, $Y_2O_3$, $TiO_2$ or the like can be used. Regarding the metal nitride, for example, AlN, $Si_3N_4$, TaN, CrN or the like can be used. Regarding the metal carbide, for example, TaC, BC, SiC, or the like can be used.

The non-magnetic layer can be formed by, for example, a sputtering method.

In order to realize a higher recording density, the magnetic layer 16 is preferably a perpendicular magnetic recording type magnetic layer in which the axis of easy magnetization is in a direction perpendicular to the surface of the substrate, but may be an in-plane magnetic recording type magnetic layer.

The magnetic layer 16 may be formed by any conventionally known method such as a vapor deposition method, an ion beam sputtering method, and a magnetron sputtering method, but it is generally formed by a sputtering method.

"Protective Layer"

The protective layer 17 is a layer for protecting the magnetic layer 16. The protective layer 17 may be composed of one layer and may be composed of a plurality of layers. The protective layer 17 is a layer made of a nitrogen-containing carbon or silicon carbide and is preferably a layer containing carbon.

Regarding a film formation method of the protective layer 17, a sputtering method using a carbon target material, a chemical vapor deposition (CVD) method using a hydrocarbon material such as ethylene and toluene, an ion beam deposition (IBD) method, or the like can be used.

"Lubricating Layer"

The lubricating layer 18 is a layer that prevents contamination of the magnetic recording medium 10, reduces a frictional force of the magnetic head of the magnetic recording and reproducing device that slides on the magnetic recording medium 10, and improves the durability of the magnetic recording medium 10.

As shown in FIG. 1, the lubricating layer 18 is in contact with and formed on the protective layer 17 by applying the lubricant for a magnetic recording medium of the above embodiment to the protective layer 17. Therefore, the lubricating layer 18 contains the above fluorine-containing ether compound.

In the lubricating layer 18, when the protective layer 17 disposed below the lubricating layer 18 is formed of carbon or a silicon carbide, the carbon or silicon carbide is bonded to a fluorine-containing ether compound contained in the lubricating layer 18 with a strong bonding strength. Asa result, even if the thickness of the lubricating layer 18 is thin, the magnetic recording medium 10 in which the surface of the protective layer 17 is covered with a high coverage is obtained, and it is possible to effectively prevent contamination on the surface of the magnetic recording medium 10.

In particular, when the protective layer 17 is formed of carbon, the bonding strength between carbon atoms contained in the protective layer 17 and a fluorine-containing ether compound contained in the lubricating layer 18 is further improved. Therefore, when the protective layer 17 is formed of carbon, even if the thickness of the lubricating layer 18 is thinner, the surface of the protective layer 17 can be sufficiently covered with a high coverage.

The average film thickness of the lubricating layer 18 is preferably 0.5 nm (5 Å) to 3 nm (30 Å) and more preferably 0.5 nm (5 Å) to 2 nm (20 Å), When the average film thickness of the lubricating layer 18 is 0.5 nm or more, the lubricating layer 18 is formed with a uniform film thickness without forming an island shape or a mesh shape. Therefore, the lubricating layer 18 can cover the surface of the protective layer 17 with a high coverage. In addition, when the average film thickness of the lubricating layer 18 is 3 nm or less, the flying height of the magnetic head can be sufficiently reduced and the recording density of the magnetic recording medium 10 can be increased.

When the surface of the protective layer 17 is not sufficiently covered with the lubricating layer 18 with a high coverage, environmental substances adsorbed to the surface of the magnetic recording medium 10 pass through gaps in the lUbricating layer 18 and enter below the lubricating layer 18. The environmental substances that have entered the layer below the lubricating layer 18 adsorb and bond to the protective layer 17 to form contaminants. Then, during magnetic recording and reproducing, the contaminants (aggregated components) adhere (transfer) to the magnetic head as smear, the magnetic head is damaged, and magnetic recording and reproducing characteristics of the magnetic recording and reproducing device deteriorate.

Such a problem caused when environmental substances enter through gaps in the lubricating layer 18 appears more significantly when the magnetic recording medium 10 is stored under high temperature conditions.

Examples of environmental substances that generate contaminants include siloxane compounds (cyclic siloxanes and linear siloxanes), ionic compounds (ionic impurities), and relatively high-molecular-weight hydrocarbons such as octacosane and plasticizers such as dioctyl phthalate. Examples of metal ions contained in ionic impurities include sodium ions and potassium ions. Examples of inorganic ions contained in ionic impurities include chlori.de ions, bromine ions, nitrate ions, sulfate ions, and ammonium ions. Examples of organic ions contained in ionic impurities include oxalate ions and formate ions.

"Method of Forming a Lubricating Layer"

Examples of a method of forming the lubricating layer 18 include a method of preparing a magnetic recording medium during production in which respective layers up to the protective layer 17 are formed on the substrate 11 and applying a solution for forming a lubricating layer to the protective layer 17.

The solution for forming a lubricating layer is obtained by diluting the lubricant for a magnetic recording medium of the above embodiment in a solvent as necessary to obtain a viscosity and a concentration suitable for the coating method.

Examples of the solvent used for the solution for forming a lubricating layer include a fluorinated solvent such as Vertrel (registered trademark) XF (product name, commercially available from DU Pont-Mitsui Fluorochemicals Co., Ltd).

A method of applying a solution for forming a lubricating layer is not particularly limited, and examples thereof include a spin coating method and a dip method When a dip method is used, for example, the following method can be used. First, the substrate 11 in which respective layers up to the protective layer 17 are formed is immersed in a solution for forming a lubricating layer that is put into an immersion tank of a dip coating device. Next, the substrate 11 is pulled up from the immersion tank at a predetermined speed in this way, the solution for forming a lubricating layer is applied to the surface on the protective layer 17 of the substrate 11.

When a dip method is used, the solution for forming a lubricating layer can be uniformly applied to the surface of the protective layer 17, and the lubricating layer 18 with a uniform thickness can be formed on the protective layer 17.

In the magnetic recording medium 10 of the present embodiment, at least the magnetic layer 16, the protective layer 17, and the lubricating layer 18 are sequentially provided on the substrate 11. In the magnetic recording medium 10 of the present embodiment, the lubricating layer 18 containing the above fluorine-containing ether compound is in contact with and formed on the protective layer 17. The lubricating layer 18 covers the surface of the protective layer 17 with a high coverage even if the thickness thereof is thin.

Therefore, in the magnetic recording medium 10 of the present embodiment, it is possible to prevent environmental substances that generate contaminants such as ionic impurities from entering through gaps in the lubricating layer 18 and it is possible to realize a state in which fewer contaminants are present on the surface.

EXAMPLES

The present invention will be described below in further detail with reference to examples and a comparative example. Here, the present invention is not limited to the following examples.
[Simulation]

A simulation was performed assuming that a lubricating layer was formed on a protective layer of a magnetic recording medium using a lubricant containing a fluorine-containing ether compound of the above embodiment, and the relationship between the film thickness and the coverage of the lubricating layer and pollution (contamination) of the magnetic recording medium was examined.
1. Calculation Model The structural models of the protective layer, lubricant, and contaminant used for the simulation were as follows.

(Protective Layer Model)

The protective layer model was a layer made of carbon containing adsorption sites having high affinity with a lubricant. While the structure will be described in detail below, the conclusions derived from the simulation are not limited thereto.

Figure 2:
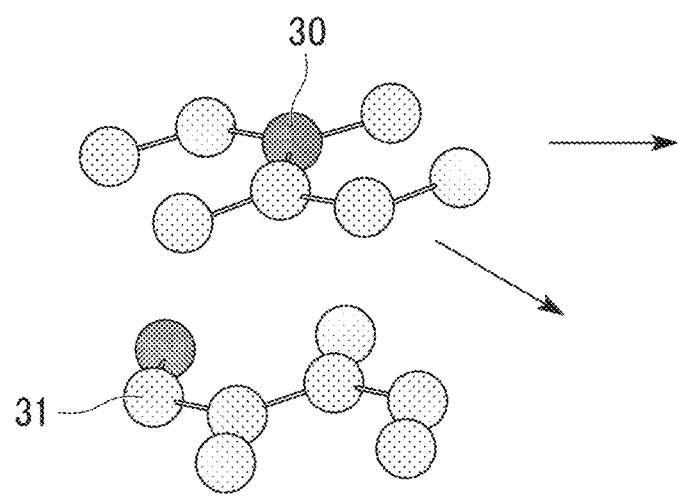
FIG. 2 is a schematic view for showing a structure of a protective layer used for a simulation.

FIG. 2 is a schematic view for showing a structure of a protective layer used for a simulation. In FIG. 2, dark circles indicate nitrogen atoms 30 and light circles indicate carbon atoms 31. In the simulation, as shown in FIG. 2, two layers of nitrogen-doped graphene were used as the protective layer. FIG. 2 shows only a unit structure of each nitrogen-doped graphene layer. In the simulation, periodic boundary conditions in which the unit structure of each nitrogen-doped graphene layer shown in FIG. 2 was repeated infinitely in directions indicated by arrows were set. In each nitrogen-doped graphene layer, some of carbon atoms 31 in graphene were substituted with nitrogen atoms 30. A proportion of nitrogen atoms 30 in each nitrogen-doped graphene layer was set to 12.5% as shown in FIG. 2.

Here, the reason for using nitrogen-doped graphene as a model was that the protective layer was a layer basically made of carbon or silicon carbide, but generally, by serving as adsorption sites for oxygen, nitrogen, or the like, the bond with a polar group of the lubricant was strengthened (refer to Patent Document 4). In addition, the reason for using the 2-layer graphene structure was because there was an example in which a protective layer made of graphite was used (refer to Patent Document 5).

(Lubricant Model)

Fluorine-containing ether compounds having configurations shown in Table 1 were used as lubricants. Lubricants used in a simulation number 1 to a simulation number 19 shown in Table 1 were the fluorine-containing ether compound of the above embodiment represented by the General Formula (1). As shown in Table 1, in lubricants used in the simulation number 1 to the simulation number 19, those represented by the General Formula (8) to the General Formula (23) were used as a trivalent atom or a trivalent atom group X in the General Formula (I), and those represented by the General Formula (2) or the General Formula (4) were used as the linking group A. In addition, in lubricants used in the simulation number 1 to the simulation number 19 shown in Table 1, those represented by the General Formula (5) or (6) were used as the linking group B, and a hydroxyl group or those represented by the General Formula (7-1) in which r was zero were used as the substituent D. In the lubricants used in the simulation number 1 to the simulation number 19 shown in Table 1, a length (in other words, values of m and n in the General Formula (5)) of the linking group B in the General Formula (1) was adjusted so that the total molecular weight was about 2,000 to 2,400.

In addition, regarding a lubricant used in a simulation number 20 shown in Table 1, a fluorine-containing ether compound represented by the following General Formula (24) (in the General Formula (24), w is 10, and x is 10) was used.

[Chem. 7]

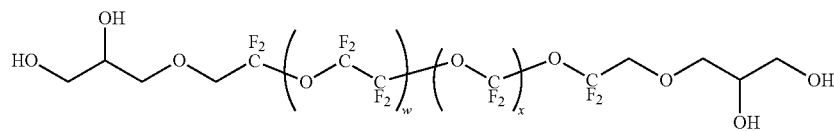

(24)

TABLE 1

| Simulation number | X (general formula) | A (general formula) | B (general formula) | D (general formula) | Film thickness [Å] | Coverage [%] | Normalized number of siloxane contaminants [—] |
|---|---|---|---|---|---|---|---|
| 1 | (8) | (2) | (5) m = 2, n = 2 | (7-1) r = 0 | 9.28 | 86.5 | 0.29 |
| 2 | (9) | (2) | (5) m = 2, n = 2 | (7-1) r = 0 | 9.80 | 85.0 | 0.33 |
| 3 | (10) | (2) | (5) m = 2, n = 2 | (7-1) r = 0 | 9.09 | 84.7 | 0.26 |
| 4 | (11) | (2) | (5) m = 2, n = 2 | (7-1) r = 0 | 8.85 | 89.0 | 0.12 |
| 5 | (12) | (2) | (5) m = 2, n - 2 | (7-1) r = 0 | 8.21 | 82.8 | 0.22 |
| 6 | (13) | (2) | (5) m = 2, n = 2 | (7-1) r = 0 | 8.74 | 85.0 | 0.33 |
| 7 | (14) | (2) | (5) m = 2, n = 2 | (7-1) r = 0 | 9.04 | 85.4 | 0.20 |
| 8 | (15) | (2) | (5) m = 2, n = 2 | (7-1) r = 0 | 9.09 | 85.9 | 0.00 |
| 9 | (16) | (2) | (5) m = 2 n = 2 | (7-1) r = 0 | 8.52 | 87.1 | 0.02 |
| 10 | (17) | (2) | (5) m = 2, n = 2 | (7-1) r = 0 | 8.30 | 84.7 | 0.12 |
| 11 | (18) | (2) | (5) m = 2, n = 2 | (7-1) r = 0 | 9.20 | 84.1 | 0.42 |
| 12 | (19) | (2) | (5) m = 2, n = 2 | (7-1) r = 0 | 9.77 | 87.0 | 0.27 |
| 13 | (20) | (2) | (5) m = 2, n = 2 | (7-1) r = 0 | 8.89 | 84.5 | 0.38 |
| 14 | (21) | (2) | (5) m = 2, n = 2 | (7-1) r = 0 | 8.97 | 84.7 | 0.61 |
| 15 | (22) | (2) | (5) m = 2, n = 2 | Hydroxy group | 8.93 | 84.5 | 0.18 |
| 16 | (22) | (2) | (5) m = 2, n = 2 | (7-1) r = 0 | 8.04 | 87.1 | 0.19 |
| 17 | (22) | (2) | (6) q = 4 | Hydroxy group | 9.31 | 82.5 | 0.34 |
| 18 | (23) | (4) P = 1 | (5) m = 2, n = 2 | (7-1) r = 0 | 8.67 | 86.4 | 0.13 |
| 19 | (23) | (4) P = 3 | (5) m = 2, n = 2 | (7-1) r = 0 | 9.39 | 85.8 | 0.18 |
| 20 | — | — | — | — | 9.02 | 80.5 | 1.00 |

(Contaminant Model)

Octamethylcyclotetrasiloxane (a cyclic siloxane) was used for the contaminant model. A siloxane is a compound having a framework of silicon and oxygen, and generally refers to a compound having a Si—O—Si bond (siloxane bond). It is known that, since low-molecular-weight cyclic siloxanes have particularly high volatility, they vaporize at room temperature or at about a body temperature, and diffuse into the air, which causes contamination. Therefore, a siloxane contamination simulation was performed in this case using octamethylcyclotetrasiloxane which is a typical cyclic siloxane.

2. Calculation Procedure (Charge Calculation)

Atomic charges of the protective layer, lubricant, and cyclic siloxane structural models described above were determined by quantum chemical calculation. In calculation of charges of respective structural models, optimization of the structure for calculating a stable structure was performed and atomic charges in the structure were then calculated.

In calculation of the stable structure of a lubricant and a cyclic siloxane, B3LYP/6-31G* was used, and atomic charges in the obtained stable structure were obtained through Minimal Basis set Mulliken population analysis. In calculation of the stable structure of the protective layer, HSEH1PBE/6-31G* was used, and atomic charges were calculated through Mulliken population analysis. In these quantum chemical calculations, a Gaussian09 program package (commercially available from Gaussian) was used.

Molecular dynamics calculation was performed using charge data calculated as described above under the following conditions, a lubricant application simulation and a contamination simulation were performed, and the film thickness and the coverage of the lubricating layer, and pollution (contamination) of the magnetic recording medium were evaluated.

(Lubricant Application Simulation)

A Dreiding force field was used as a molecular force field, and a value of a depth parameter of a Lennard-Jones potential between the protective layer and the lubricating layer was scaled by ½ (a parameter of c was reduced to ½ of its original value) to match the results of quantum chemical calculations. In calculation of a long-distance Coulomb interaction, the Particle-Particle Particle-Mesh Ewald method was used. In addition, a cutoff method was used for the Lennard-Jones interaction. The cutoff distance was 12 Å at which the interaction was negligible. A speed scaling method was used as a temperature control method and a simulation was performed using an NVT ensemble in which the number of particles (N), the volume (V), and the temperature (T) were fixed. Molecular dynamics calculation was performed using J-OCTA, molecular dynamics engine VSOP (commercially available form JSOL).

A lubricant application simulation was performed by disposing a structural model of the protective layer in a 48 Å×42 Å×70 Å periodic boundary cell and fixing the protective layer in the simulation so that it did not move.

Then, a lubricant application simulation shown below was performed, and thus a state in which the lubricating layer covered the protective layer at room temperature was reproduced. FIG. 3(a) to FIG. 3(e) are schematic views for showing a lubricant application simulation. In FIG. 3(a) to FIG. 3(e), the reference numeral 1a indicates a lubricant, the reference numeral 1b indicates a lubricating layer, and the reference numeral 20 indicates a protective layer.

Figure 3:
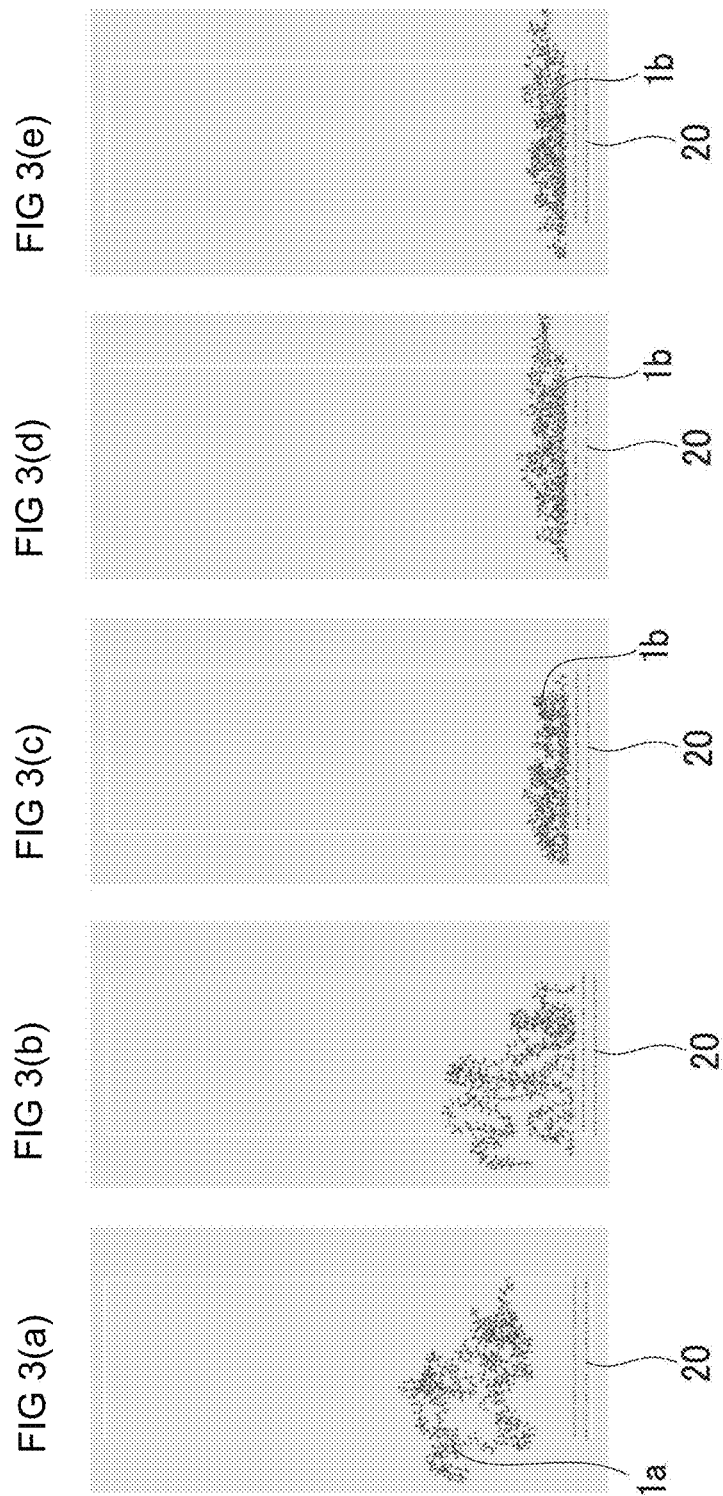
FIG. 3(a) to FIG. 3(e) are schematic views showing a lubricant application simulation.

First, as shown in FIG. 3(a), the lubricant 1a was randomly disposed above the surface of the protective layer 20. In this case, the number of molecules of the lubricant 1a was adjusted so that the film thickness of the lubricating layer 1b at room temperature became about 9 Å. This was to compare the coverage and the siloxane contamination resistance in a lubricating layer having a thin film thickness of 10 Å or less between simulation numbers 1 to 20.

Next, a downward force was applied to hydrogen atoms disposed at the end of the lubricant 1a, and as shown in FIG. 3(b) and FIG. 3(c), the lubricant 1a was lowered and the lubricating layer 1b was formed on the surface of the protective layer 20. Here, FIG. 3(b) is a structure during calculation and FIG. 3(c) is a structure of the lubricating layer 1b after calculation of 20 ps.

Subsequently, in order to reproduce a structure of the lubricating layer in a thermal equilibrium state at room temperature, a downward force applied to hydrogen atoms disposed at the end of the lubricant 1a was released, and the following simulation was performed. In order to reach a thermal equilibrium state in a short time, first, molecular dynamics calculation was performed for 5 ns at a high temperature of 300 K or higher, and a structure of the lubricating layer 1b shown in FIG. 3(d) was obtained. Then, in order to reproduce a structure of the lubricating layer 1b at room temperature, molecular dynamics calculation was performed for 5 ns at 300 K, and a structure of the lubricating layer 1b shown in FIG. 3(e) was obtained. Here, in the simulations of FIG. 3(d) and FIG. 3(e), it was confirmed that a thermal equilibrium state was reached in 3 ns.

Next, the film thickness and the coverage of the lubricating layer were evaluated according to the following method.

(Film Thickness of Lubricating Layer)

A height from the surface of the protective layer to the surface of the lubricating layer was set as a film thickness. However, generally, since the film thickness of the lubricating layer is not uniform, the value of the film thickness varies depending on a measurement position. In order to avoid this problem, in this case, a value obtained by averaging the film thicknesses in the entire space in the periodic boundary cell was evaluated as a film thickness of the lubricating layer.

(Coverage of Lubricating Layer)

The coverage of the lubricating layer 1b was calculated using the following formula.

Coverage=area occupied by atoms covering the surface of the protective layer/entire area of the surface of the protective layer×100

In the above formula, "atoms covering the surface of the protective layer" refers to atoms of a fluorine-containing ether compound present within 6 Å from the surface of the protective layer 20, among atoms of the fluorine-containing ether compound present on the protective layer 20. The "area occupied by atoms covering the surface of the protective layer" corresponds to an area occupied by a set of circles with a radius of 1.5 Å (approximately a Van der Waals radius) from the center of atoms covering the surface of the protective layer.

(Simulation of Siloxane Contamination)

A simulation in which the temperature of the lubricating layer 1b was reduced to 300 K was performed for 5 ns and the structure of the lubricating layer 1b was then randomly extracted at different times between 3 ns to 5 ns, and used as an initial structure of the lubricating layer 1b in siloxane contamination simulation. In order to reduce statistical errors and increase reliability of the calculation results, the following calculation was performed using three initial structures, and a statistical average value was set as an evaluation result.

50 cyclic siloxane molecules were randomly disposed above the surface of the lubricating layer 1b in FIG. 3(e), a molecular dynamics calculation was performed for 10 ns at a temperature of 300 K, and a state in which cyclic siloxane entered a layer below the lubricating layer was obtained. Then, the number of siloxane contaminants was evaluated according to the following method.

Figure 4:
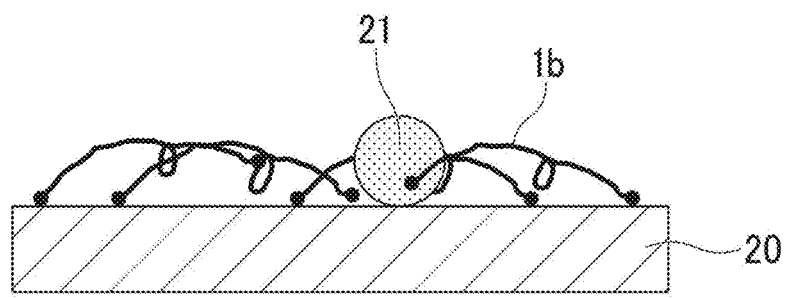
FIG. 4 is a schematic view showing a method of evaluating the number of siloxane contaminants.

FIG. 4 is a schematic view for showing a method of evaluating the number of siloxane contaminants. In the above simulation results, the number of molecules of cyclic siloxane 21 that have entered the lubricating layer 1b and adsorbed on the surface of the protective layer 20 was measured as the number of siloxane contaminants. Here, a cyclic siloxane of which the height of the molecular center was within 5 Å from the surface of the protective layer was defined as a contaminating cyclic siloxane.

Then, the value of the number of siloxane contaminants of the lubricating layer formed in the simulation number 20 shown in Table 1 was set as a reference (1.00), the numbers of siloxane contaminants of the lubricating layer formed in the simulation numbers 1 to 19 were converted, and the normalized number of siloxane contaminants was obtained.

(Simulation Results)

The results of the calculated film thickness and coverage of the lubricating layer, and normalized number of siloxane contaminants are shown in Table 1. As shown in Table 1, the thicknesses of the lubricating layers obtained using the lubricant 1 to the lubricant 20 were in a range of 8.04 to 9.80 Å.

In the results, all of the lubricant 1 to the lubricant 19 as the fluorine-containing ether compound represented by the General Formula (1) had a coverage of 2.5% or more higher than at of the lubricant 20. In addition, the lubricant 1 to the lubricant 19 had a normalized number of siloxane contaminants of 0.61 or less and all of them were very small compared to that for the lubricant 20.

Based on the above simulation results, when a lubricating layer was formed using a fluorine-containing ether compound represented by the General Formula (1), a lubricating layer having a thin film thickness, a high coverage and excellent siloxane contamination resistance was realized. Therefore, it was speculated that, even if the thickness thereof was thin, a lubricant containing the fluorine-containing ether compound represented by the General Formula (1) could cover the surface of the protective layer with a high coverage and it was possible to reduce contamination of the magnetic recording medium, Example 1

According to the following method, a fluorine-containing ether compound represented by the General Formula (I) was synthesized and evaluated, in Example 1, a compound in which a trivalent atom or a trivalent atom group X in the General Formula (1) was the General Formula (22), the linking group A was the General Formula (2), the linking group B was the General Formula (5), and a substituent D was a hydroxyl group was synthesized.

Synthesis Example 380 mL of t-butanol was put into a 500 mL eggplant flask and 10 g of cyclohexane triol and 180 mL of epichlorohydrin were additionally put thereinto and stirred until they became uniform to obtain a mixture.

Next, 18 g of sodium hydroxide was added to the mixture and stirred at 70° C. for 10 hours. Then, the mixture was cooled to 25° C. and 1 L of ethyl acetate and 200 mL of deionized water were additionally added thereto and the mixture was washed with water. Next, an organic phase in the eggplant flask was collected and sodium sulfate was added to the organic phase for dehydration and filtration was performed by a filter.

Next, the solvent was distilled off from the filtrate using an evaporator. Then, column purification (silica gel column chromatography using ethyl acetate/hexane as a solvent) was performed and thereby a colorless and transparent liquid compound 1-a (1 g) including a compound represented by the following General Formula (25) was obtained.

$^1$H-NMR measurement of the obtained compound 1-a was performed and the structure was identified based on the following results.

$^1$H-NMR(400 MHz. CDCl$_3$): δ(ppm)=3.761 (3H), 3.440 (3H), 3.314 (3H), 3.126 (3H), 2.795 (3H), 2.611 (3H), 2.409 (3H), 1.227 (3H)

[Chem. 8]

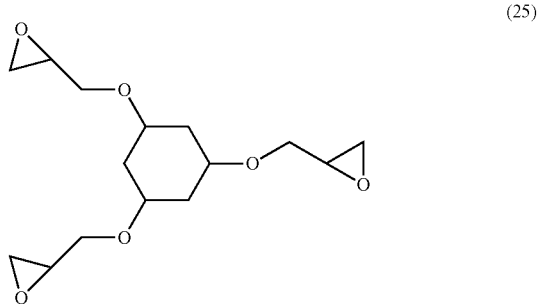

(25)

(Synthesis of Fluorine-Containing Ether Compound)

Under a nitrogen atmosphere, 1 g of the compound 1-a and 40 g of a fluoropolyether (with a number-average molecular weight of 800 and a molecular weight distribution of 1.02) represented by HOCH$_2$CF$_2$O(CF$_2$CF$_2$O)$_n$(CF$_2$O)$_m$(CF$_2$CH$_2$OH (in the formula, m is an integer of 2 to 5 and n is an integer of 2 to 5) were put into a 200 mL eggplant flask, and stirred until they became uniform to obtain a mixture.

Next, 1.4 g of potassium tert-butoxide was added to the mixture and stirred at 70° C. for 6 hours. Then, the mixture was cooled to 25° C. and neutralized with hydrochloric acid, and a fluorinated solvent (product name: Asahiklin (registered trademark) AK-225, commercially available from AGC Inc.) was then added thereto, and the mixture was washed with water. Next, an organic phase in the eggplant flask was collected and sodium sulfate was added to the organic phase for dehydration and filtration was performed by a filter.

Next, the solvent was distilled off from the filtrate using an evaporator and supercritical extraction was then performed under conditions of 60° C. and 19 MPa, and thereby a colorless and transparent liquid compound 1-b (4.5 g) including a compound represented by the following General Formula (26) was obtained.

$^1$H-NMR measurement and $^{19}$F-NMR measurement of the obtained compound 1-b were performed and the structure was identified based on the following results.

$^1$H-NMR (400 MHz, acetone-D$_6$): δ(ppm)=1.227 (3H), 2.530 (3H), 3.461 (3H), 3.598 (3H), 3.648 (3H), 3.735 (3H), 3.799 to 3.948 (12H), 4.037 to 4.110 (6H)

$^{19}$F-NMR (400 MHz, acetone-D$_6$): δ(ppm)=−90.57 to −88.88 (36F), −83.21 to −81.20 (6F), −80.64 to −78.64 (6F), −53.32 to −51.94 (18F)

[Chem. 9]

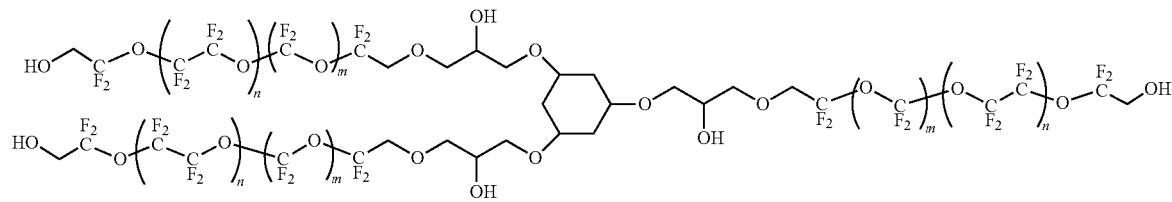

(26)

(in the General Formula 26), m is an integer of 2 to 5, and n is an integer of 2 to 5).

The compound 1-b obtained in this manner was dissolved in Vertrel (registered trademark) XF (product name, commercially available from Du Pont-Mitsui Fluorochemicals Co., Ltd.). Then, a diluted solution of the compound 1-b was prepared so that the film thickness during coating was 8 Å to 15 Å.

Next, as shown in FIG. 1, the magnetic recording medium 10 in which the adhesion layer 12, the soft magnetic layer 13, the first underlayer 14, the second underlayer 15, the magnetic layer 16, the protective layer 17, and the lubricating layer 18 were sequentially provided on the substrate 11 was prepared. The protective layer 17 was made of carbon. The lubricating layer 18 was formed according to the following method.

The diluted solution of the compound 1-b was applied to the protective layer of the magnetic recording medium with a diameter of 65 mm in which respective layers up to the protective layer 17 were formed by a dip method, and thereby a lubricating layer including the compound 1-b was formed. Here, the dip method was performed under conditions of an immersion speed of 10 min/sec, an immersion time of 30 sec, and a pulling speed of 1.2 mm/sec.

The film thickness of the obtained lubricating layer was measured using FT-IR (product name: Nicolet iS50, commercially available from Thermo Fisher Scientific). The results are shown in Table 2.

(Evaluation of Silicone Contamination Resistance)

An LUL type hard disk drive was prepared, and a magnetic recording medium in which a lubricating layer including the compound 1-b was formed was mounted. Regarding the magnetic head, a perpendicular magnetic recording head was used. A commercially available silicone rubber gel tip (1 cm×1 cm×0.5 cm) was put into the hard disk drive, and a continuous LUL operation was repeated under the following environment.

Figure 5:
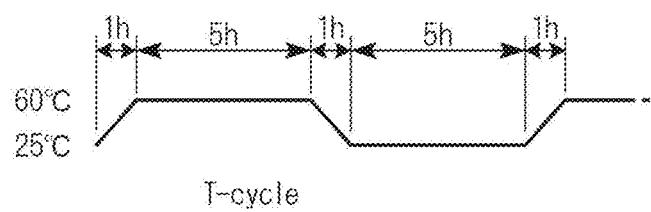
FIG. 5 is a diagram showing an environment in which a continuous LUL operation is repeated.

That is, as shown in FIG. 5, under a dry (relative humidity of 10% or less) environment, a cycle operation (1 hour each for startup (raising temperature) and shutdown (lowering temperature)) of 25+ C. (for 5 hours)→60° C. (for 5 hours)→25° C. (for 5 hours) was continued until the following endurance time was reached.

The endurance time was a time from when a continuous LUL operation started (from when temperature raising from 25° C. to 60° C. started) until a drive current of the spindle motor of the hard disk drive exceeded a threshold value.

It was speculated that, when the lubricating layer was uniformly formed without gaps, a cyclic siloxane vaporized from the silicone rubber gel tip was prevented from adhering to the magnetic recording medium. As a result, no load was applied to the spindle motor of the hard disk drive and the endurance time became longer. On the other hand, when there were gaps in the lubricating layer, the vaporized cyclic siloxane adhered to the magnetic recording medium, a load was applied to the spindle motor of the hard disk drive, and the endurance time became shorter.

When the endurance time was 150 hours or longer, this was evaluated as "a" and when the endurance time was 100 hours or longer or when the endurance time was shorter than 100 hours, this was evaluated as "×." The results are shown in Table 2.

(Octacosane Adhesion Test)

In the same manner as in the evaluation of the silicone contamination resistance described above, a maanetic recording medium in which a lubricatina layer including the compound 1-b was formed was produced.

Separately, a jig in which a recess with a diameter of 4.5 mm and a height of 0.5 mm was formed was prepared, 10 µL of a 50 ppm octacosane ($C_{28}H_{58}$) solution (solvent hexane) was added dropwise into a hole thereof, and hexane was completely evaporated.

Next, on the jig containing octacosane, a magnetic recording medium in which a lubricating layer was formed was covered so that the lubricating layer faced a surface on which the recess of the jig was formed.

Next, the magnetic recording medium was put into a glass petri dish together with the jig, and additionally wrapped with an aluminum foil and heated at 80° C. for 24 hours and then left at room temperature for 24 hours.

Then, the entire surface (the surface of the lubricating layer) of the magnetic recording medium on the side facing the jig was observed by an optical surface analyzer (OSA: Candela 6300, commercially available from KLA Tensor).

In the observation by the OSA, when a scattered light intensity of a divided micro area exceeded a certain intensity, this was counted as one, and the number of scattered light beams was measured.

When the lubricating layer was uniform without gaps (a coating coverage was high), since adhesion of the vaporized octacosane to the magnetic recording medium was prevented, the number of counts was reduced. On the other hand, when there were gaps in the lubricating layer, since the vaporized octacosane adhered to the surface of the magnetic recording medium to form a crystal, and light was strongly scattered, the number of counts of scattered light increased.

When the number of scattered light beams was less than 100, this was evaluated as "○" when the number of scattered light beams was 100 or more and less than 500, this was evaluated as "Δ" and when the number of scattered light beams was 500 or more, this was evaluated as "×". The results are shown in Table 2.

Example 2

According to the following method, a fluorine-containing ether compound represented by the General Formula (1) was synthesized and evaluated. In Example 2, a compound in which a trivalent atom or a trivalent atom group X in the General Formula. (1) was the General Formula (22), the linking group A was the General Formula (2), the linking group B was the General Formula (5), and r in the substituent D represented by the General Formula (7-1) was zero was synthesized.

Under a nitrogen atmosphere, 36 mL of t-butanol and 4 g of the compound 1-b were put into a 50 mL eggplant flask and stirred until they became uniform to obtain a mixture. Next, 0.4 g of potassium tert-butoxide was added to the mixture, and 300 μL of glycidol was added thereto while heating at 70° C. and stirred for 5 hours.

Then, the mixture was cooled to 25° C. and neutralized with hydrochloric acid, and a fluorinated solvent (product name: Asahiklin AK-225, commercially available from AGC Inc.) was then added thereto, and the mixture was washed with wader.

Next, an organic phase in the eggplant flask was collected and sodium sulfate was added to the organic phase for dehydration and filtration was performed by a filter. Next, the solvent was distilled off from the filtrate using an evaporator. Then, in the same manner as in Example 1, supercritical extraction was performed under conditions of 60° C. and 19 MPa, and thereby a colorless and transparent liquid compound 1-c (2 g) including a compound represented by the following General Formula (27) was obtained.

$^{1}$H-NMR measurement and $^{19}$F-NMR measurement of the obtained compound 1-c were preformed and the structure was identified based on the following results.

$^{1}$H-NMR (400 MHz, d-acetone): Δ(ppm)=1.211. (3H), 2.523 (3H), 3.452 (3H), 3.574 (3H), 3.625 (3H), 3.744 (6H), 3.797 to 3.901 (12H), 3.927 to 4.116 (18H)

$^{19}$F-NMR (400 MHz, d-acetone): δ(ppm)=−90.87 to −89.19 (36F), −81.43 to −78.90 (12F), −55.63 to −52.29 (18F)

[Chem. 10]

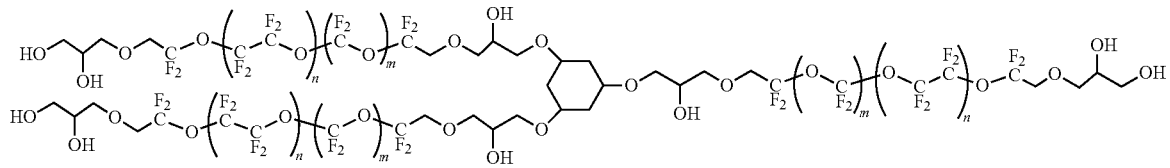

(27)

(in the General Formula 27), m is an integer of 2 to 5, and n is an integer of 2 to 5).

Example 3

According to the following method, a fluorine-containing ether compound represented by the General Formula (1) was synthesized and evaluated. In Example 3, a compound in which a trivalent atom or a trivalent atom group X in the General Formula (1) was the General Formula (22), the linking group A was the General Formula (2), the linking group B was the General Formula (6), and the substituent D was a hydroxyl group was synthesized.

Under a nitrogen atmosphere, 1 g of the compound 1-a and 40 g of a fluoropolyether (with a number-average molecular weight of 800 and a molecular weight distribution of 1.03) represented by $HOCH_2CF_2O(CF_2CF_2O)_q CF_2CH_2OH$ (in the formula, q is an integer of 3 to 7.) were put into a 200 mL eggplant flask, and stirred until they became uniform to obtain a mixture. Next, 1.4 g of potassium tert-butoxide was added to the mixture and stirred at 70° C. for 6 hours.

Then, the mixture was cooled to 25° C. and neutralized with hydrochloric acid, and a fluorinated solvent (product name: Asahiklin (registered trademark) AK-225, commercially available from AGC Inc.)was then added thereto, and the mixture was washed with water. Next, an organic phase in the eggplant flask was collected and sodium sulfate was added to the organic phase for dehydration and filtration was performed by a filter. Next, the solvent was distilled off from the filtrate using an evaporator. Then, in the same manner as in Example 1, supercritical extraction was performed under conditions of 60° C. and 19 MPa, and thereby a colorless and transparent liquid compound 1-d (2.6 g) including a compound represented by the following General Formula (28) was obtained.

$^{1}$H-NMR measurement and $^{19}$F-NMR measurement of the obtained compound 1-d were performed, and the structure was identified based on the following results.

$^{1}$H-NMR (400 MHz, d-acetone): δ(ppm)=1.186 (3H), 2.496 (3H), 3.427 (3H), 3.551 (3H), 3.605 (3H), 3.771 (3H), 3.806 to 3.931 (12H), 4.030 to 4.081 (6H)

$^{19}$F-NMR (400 MHz, d-acetone): δ(ppm)=−89.07 (60F), −81.37 (6F), −78.85 (6F)

[Chem. 11]

(28)

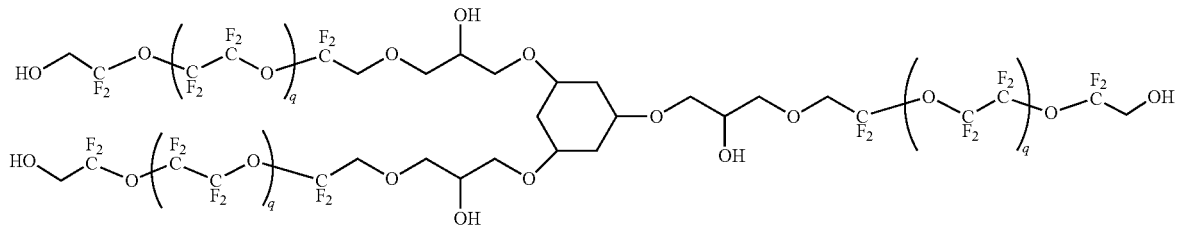

(in the General Formula q is an integer of 3 to 7).

Example 4

According to the following method, a fluorine-containing ether compound represented by the General Formula (1) was synthesized and evaluated. In Example 4, a compound in which a trivalent atom or a trivalent atom group X in the General Formula (1) was the General Formula (22), the linking group A was the General Formula (2), the linking group B was the General Formula (6), and r in the substituent D represented by the General Formula (7-1) was zero was synthesized.

Under a nitrogen atmosphere, 36 mL of t-butanol and 2 g of the compound 1-d were put into a 50 mL eggplant flask, and stirred until they became uniform to obtain a mixture. Next, 0.2 g of potassium tert-butoxide was added to the mixture and 150 µL of glycidol was added thereto while heating at 70° C. and stirred for 5 hours.

Then, the mixture was cooled to 25° C. and neutralized with hydrochloric acid, and a fluorinated solvent (product name: Asahiklin AK-225, commercially available from AGC Inc.) was then added thereto, and the mixture was washed with water.

Next, an organic phase in the eggplant flask was collected and sodium sulfate was added to the organic phase for dehydration and filtration was performed by a filter. Next, the solvent was distilled off from the filtrate using an evaporator and supercritical extraction was then performed under conditions of 60° C. and 19 MPa in the same manner as in Example 1, and thereby a colorless and transparent liquid compound 1-e (1.6 g) including a compound represented by the following General Formula (29) was obtained.

$^1$H-NMR measurement and $^{19}$F-NMR measurement of the obtained compound 1-e were performed and the structure was identified based on the following results.

$^1$H-NMR (400 MHz, d-acetone): δ(ppm)=1.185 (3H), 2.499 (3H 3.427 (3 H), 3.554 (3H), 3.600 (3H), 3.709 (6H), 3.735 to 3.918 (12H), 4.029 to 4.078 (18H)

$^{19}$F-NMR (400 MHz, d-acetone): δ(ppm)=−88.67 (60F), −78.43 (12F)

Example 5

According to the following method, a fluorine-containing ether compound represented by the General Formula (I) was synthesized and evaluated. In Example 5, a compound in which a trivalent atom or a trivalent atom group X in the General Formula (1) was the General Formula (22), the linking group A was the General Formula (2), q in the linking group B represented by the General Formula (6) was 2, and the substituent D was a hydroxyl group was synthesized.

Under a nitrogen atmosphere, 5.0 g of the compound 1-a and 101.4 g of a fluoropolyether represented by HOCH$_2$CF$_2$O(CF$_2$CF$_2$O)$_2$CF$_2$CF$_2$OH were put into a 200 mL eggplant flask and stirred while heating at 75° C. until they became uniform to obtain a mixture.

Next, 6.8 g of potassium carbonate was added to the mixture and stirred for 8 hours while heating at 75° C.

Then, the mixture was cooled to 25° C. and neutralized with hydrochloric acid, dichloromethane (90 mL) and methanol (40 mL) were then added thereto, and transferred to a separation funnel, and the mixture was washed with water.

Next, an organic phase was collected from the separation funnel and sodium sulfate was added to the organic phase for dehydration and filtration was performed by a filter.

Next, the solvent was distilled off from the filtrate using an evaporator, supercritical extraction was then performed under conditions of 60° C. and 24 MPa, and thereby a colorless and transparent liquid compound 1-f (13.2 g) including a compound represented by the following General Formula (30) was obtained.

$^1$H-NMR measurement and $^{19}$F-NMR measurement of the obtained compound 1-f were performed and the structure was identified based on the following results.

$^1$H-NMR (400 MHz, hexafluorobenzene/acetone-D$_6$=4/1v/v): δ(ppm)=4.09 (6H), 3.95 (6H), 3.91 to 3.81 (6H), 3.80 to 3.72 (3H), 3.71 to 3.65 (3H), 3.65 to 3.57 (3H), 3.55 to 3.43 (3H), 2.60 to 2.47 (3H), 1.36 to 1.19 (3H)

$^{19}$F-NMR (400 MHz, hexafluorobenzene/acetone-D$_6$=4/1v/v): δ(ppm)=−89.50 to −89.20 (12F), −89.17 to −88.86 (12F), −81.03 (6F), −78.64 (6F)

[Chem. 12]

(29)

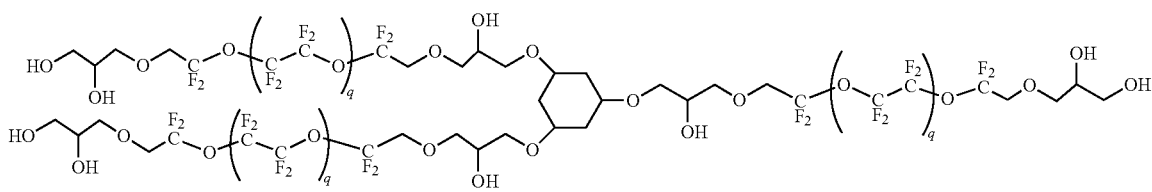

(in the General Formula (29), q is an integer of 3 to 7).

[Chem. 13]

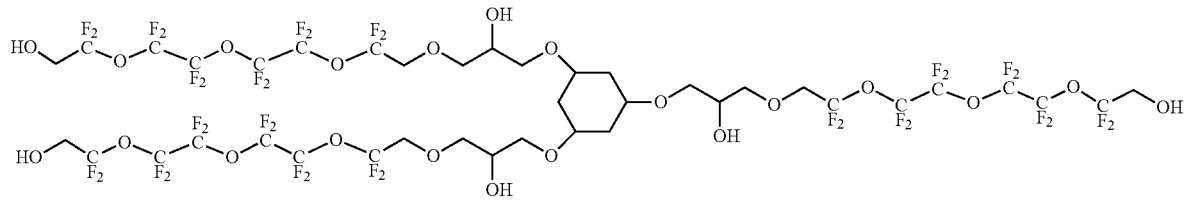

(30)

Example 6

According to the following method, a fluorine-containing ether compound represented by the General Formula (1) was synthesized and evaluated. In Example 6, a compound in which a trivalent atom or a trivalent atom group X in the General Formula (1) was the General Formula (23), p in the linking group A represented by the General Formula (4) was 3, the linking group B was the General Formula (5), and the substituent D was a hydroxyl group was synthesized.
(Synthesis of Fluorine-Containing Ether Compound)

Under a nitrogen atmosphere, 1 g of tris(4,5-epoxypentyl) isocyanurate (product name: TEPIC-VL, commercially available from Nissan Chemical Corporation) and 31 g of a fluoropolyether (with a number-average molecular weight of 800 and a molecular weight distribution of 1.02) represented by $HOCH_2CF_2O(CF_2CF_2O)_m(CF_2O)_nCF_2CH_2OH$ in the formula, m is an integer of 2 to 5, and n is an integer of 2 to 5.) were put into a. 200 mL eggplant flask, and stirred until they became uniform to obtain a mixture. Next, 1.4 g of potassium tert-butoxide was added to the mixture and stirred at 70° C. for 8.5 hours.

Then, the mixture was cooled to 25° C. and neutralized with hydrochloric acid, and a fluorinated solvent (product name: Asahiklin (registered trademark) AK-225, commercially available from AGC Inc.)was then added thereto, and the mixture was washed with water. Next, an organic phase in the eggplant flask was collected and sodium sulfate was added to the organic phase for dehydration and filtration was performed by a filler.

Next, the solvent was distilled off from the filtrate using an evaporator. Then, supercritical extraction was performed under conditions of 60° C. and 20 MPa, and thereby a colorless and transparent liquid compound 2-a (3.6 g) including a compound represented by the following General Formula (31) was obtained.

$^1$H-NMR measurement and $^{19}$F-NMR measurement of the obtained compound 2-a were performed and the structure was identified based on the following results.

$^1$H-NMR (400 MHz, acetone-D$_6$): δ(ppm)=1.335 (3H), 1.444 (3H), 1.598 (3H), 1.724 (3H), 3.46 to 3.56 (6H), 3.68 to 3.80 (9H), 3.85 to 4.03 (12H)

$^{19}$F-NMR (400 MHz, acetone-D$_6$): δ(ppm)=−90.38 to −88.24 (36F), −82.27 to −80.15 (6F), −79.79 to −77.50 (6F), −54.85 to −49.76 (18F)

[Chem. 14]

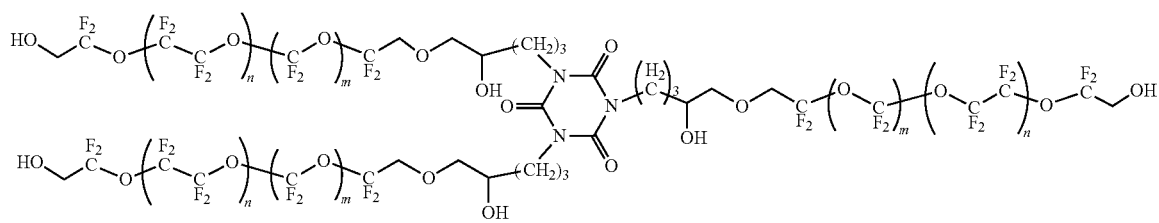

(31)

(in the General Formula (31), m is an integer of 2 to 5, and n is an integer of 2 to 5).

Example 7

According to the following method, a fluorine-containing ether compound represented by the General Formula (1) was synthesized and evaluated. In Example 7, a compound in which a trivalent atom or a trivalent atom group X in the General Formula. (1) was the General Formula (23), p in the linking group A represented by the General Formula (4) was 3, the linking group B was the General Formula (5) and r in the substituent D represented by the General Formula (7-1) was zero was synthesized.

Under a nitrogen atmosphere, 35 mL of t-butanol and 3 g of the compound 2-a were put into a 50 mL eggplant flask and stirred until they became uniform to obtain a mixture.

Next, 0.4 g of potassium ten-butoxide was added to the mixture and 270 µL glycidol was added thereto while heating at 70° C. and stirred for 5 hours.

Then, the mixture was cooled to 25° C. and neutralized with hydrochloric acid, and a fluorinated solvent (product name: Asahiklin AK-225, commercially available from AGC Inc.) was then added thereto, and the mixture was washed with water.

Next, an organic phase in the eggplant flask was collected and sodium sulfate was added to the organic phase for dehydration and filtration was performed by a filter.

Next, the solvent was distilled off from the filtrate using an evaporator, supercritical extraction was then performed under conditions of 60° C. and 23 MPa, and thereby a colorless and transparent liquid compound 2-b (1.5 g) including a compound represented by the following General Formula (32) was obtained.

$^1$H-NMR measurement and $^{19}$F-NMR measurement of the obtained compound 2-b were performed and the structure was identified based on the following results.

$^1$H-NMR (400 MHz, d-acetone): δ(ppm)=1.434 (3H), 1.530 (3H), 1.694 (3H), 1.854 (3H), 3.54 to 3.77 (12H), 3.77 to 3.90 (12H), 4.07 to 4.14 (18H)

$^{19}$F-NMR (400 MHz, d-acetone): δ(ppm)=−90.18 to −88.26 (36 F). −79.89 to −77.75 (12F), −54.68 to −51.09 (18F)

Next, 1.4 g of potassium tert-butoxide was added to the mixture and stirred at 70° C. for 7 hours.

Then, the mixture was cooled to 25° C. and neutralized with hydrochloric acid, and a fluorinated solvent (product name: Asahiklin (registered trademark) AK-225, commercially available from AGC Inc.)was then added thereto, and the mixture was washed with water. Next, an organic phase in the eggplant flask was collected and sodium sulfate was added to the organic phase for dehydration and filtration was performed by a filter.

[Chem. 15]

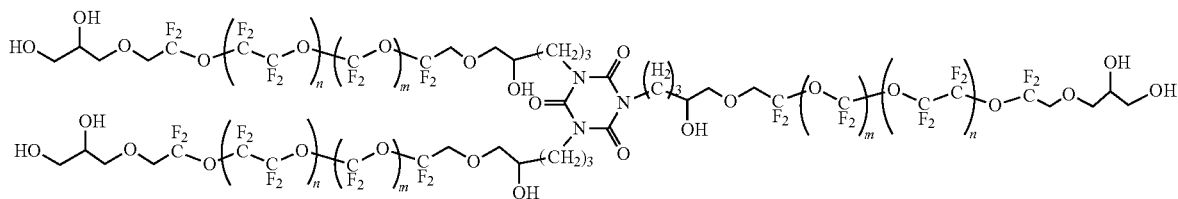

(32)

(in the General Formula (32), m is an integer of 2 to 5, and n is an integer of 2 to 5).

Example 8

According to the following method, a fluorine-containing ether compound represented by the General Formula (1) was synthesized and evaluated. In Example 8, a compound in which a trivalent atom or a trivalent atom group X in the General Formula (1) was the General Formula (23), p in the linking group A represented by the General Formula (4) was 3, the linking group B was the General Formula (6), and the substituent D was a hydroxyl group was synthesized.

Next, the solvent was distilled off from the filtrate using an evaporator. Then, supercritical extraction was performed under conditions of 60° C. and 20 MPa, and thereby a colorless and transparent liquid compound 2-c (3.0 g) including a compound represented by the following Formula (33) was obtained.

$^1$H-NMR measurement and $^{19}$F-NMR measurement of the obtained compound 2-c were performed and the structure was identified based on the following results.

$^1$H-NMR (400 MHz, d-acetone): δ(ppm)=1.337 (3H), 1.445 (3H), 1.598 (3H), 1.723 (3H), 3.46 to 3.56 (6H), 3.68 to 3.80 (9H), 3.85 to 4.03 (12H)

$^{19}$F-NMR (400 MHz, d-acetone): δ(ppm)=−89.07 (60 F), −82.21 to −80.16 (6F), −79.78 to −77.51 (6F)

[Chem. 16]

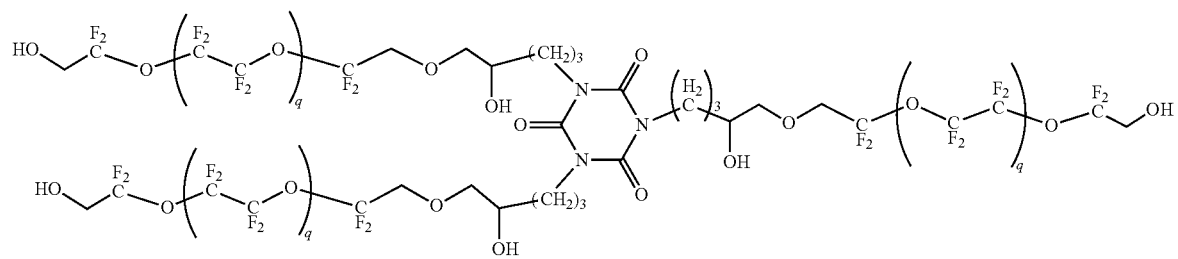

(33)

Under a nitrogen atmosphere, 1 g of tris(4,5-epoxypentyl) isocyanurate (product name: TEPIC-VL, commercially available from Nissan Chemical Corporation) and 31 g of a fluoropolyether (with a number-average molecular weight of 800 and a molecular weight distribution of 1.03) represented by HOCH$_2$CF$_2$O(CF$_2$CF$_2$O)$_q$CF$_2$CH$_2$OH (in the formula, q is an integer of 3 to 7.) were put into a 200 mL eggplant flask and stirred until they became uniform to obtain a mixture.

(in the General Formula (33), q is an integer of 3 to 7).

Example 9

According to the following method, a fluorine-containing ether compound represented by the General Formula (1) was synthesized and evaluated. In Example 9, a compound in which a trivalent atom or a trivalent atom group X in the General Formula (1) was the General Formula (23), p in the linking group A represented by the General Formula (4) was 3, the linking group B was the General Formula (6), and r in the substituent D represented by the General Formula (7-1) was zero was synthesized.

Under a nitrogen atmosphere, 35 mL of t-butanol and 3 g of the compound 2-c were put into a 50 mL eggplant flask, stirred until they became uniform to obtain a mixture. Next, 0.4 g of potassium tert-butoxide was added to the mixture, and 270 μL of glycidol was added thereto while heating at 70° C. and stirred for 6 hours.

Then, the mixture was cooled to 25° C. and neutralized with hydrochloric acid, and a fluorinated solvent (product name: Asahiklin AK-225, commercially available from AGC Inc.) was then added thereto, and the mixture was washed with water. Next, an organic phase in the eggplant flask was collected and sodium sulfate was added to the organic phase for dehydration and filtration was performed by a filter.

Next, the solvent was distilled off from the filtrate using an evaporator. Then, supercritical extraction was performed under conditions of 60° C. and 23 MPa, and thereby a colorless and transparent liquid compound 2-d (1.3 g) including a compound represented by the following Formula (34) was obtained. $^1$H-NMR measurement and $^{19}$F-NMR measurement of the obtained compound 2-d were performed and the structure was identified based on the following results.

$^{19}$F-NMR (400 MHz, d-acetone): δ(ppm)=1.435 (3H), 1.533 (3H), 1.692 (3H), 1.853 (3H), 3.54 to 3.77 (12H), 3.77 to 3.90 (12H), 4.07 to 4.14 (18H)

$^{19}$F-NMR (400 MHz, d-acetone): δ(ppm)=−88.67(60F), −79.88 to −77.77 (12F)

Example 10

According to the following method, a fluorine-containing ether compound represented by the General Formula (1) was synthesized and evaluated. In Example 10, a compound in which a trivalent atom or a trivalent atom group X in the General Formula (1) was the General Formula (23), p in the linking group A represented by the General Formula (4) was 1, the linking group B was the General Formula (5), and the substituent D was a hydroxyl group was synthesized.

Under a nitrogen atmosphere, 1 g of tris(2,3-epoxypropyl) isocyanurate (product name: TEPIC-SS, commercially available from Nissan Chemical Corporation) and 41 g of a fluoropolyether (with a number-average molecular weight of 800 and a molecular weight distribution of 1.03) represented by HOCH$_2$CF$_2$O(CF$_2$CF$_2$O)$_m$(CF$_2$O)$_n$CF$_2$CH$_2$OH (in the formula, m is an integer of 2 to 5, and n is an integer of 2 to 5.) were put into a 200 mL eggplant flask, and the mixture was stirred until it became uniform.

Next, 1.8 g of potassium tert-butoxide was added to the mixture and stirred at 70° C. for 6 hours.

Then, the mixture was cooled to 25° C. and neutralized with hydrochloric acid, and a fluorinated solvent (product name: Asahiklin (registered trademark) AK-225, commercially available from AGC Inc.) was then added thereto, and the mixture was washed with water.

Next, an organic phase in the eggplant flask was collected and sodium sulfate was added to the organic phase for dehydration and filtration was performed by a filter.

Next, the solvent was distilled off from the filtrate using an evaporator, supercritical extraction was then performed under conditions of 60° C. and 19 MPa, and thereby a colorless and transparent liquid compound 2-e (2.6 g) including a compound represented by the following General Formula (35) was obtained.

$^1$H-NMR measurement and $^{19}$F-NMR measurement of the obtained compound 2-e were performed and the structure was identified based on the following results.

$^1$H-NMR (400 MHz, d-acetone): δ(ppm)=3.62 to 3.80 (6H), 3.85 to 4.28 (21H)

$^{19}$F-NMR (400 MHz, d-acetone): δ(ppm)=−89.05 to −87.80 (36F), −82.32 to −80.69 (6F), −79.85 to −77.65 (6F), −54.89 to −50.14 (18F)

[Chem. 17]

(34)

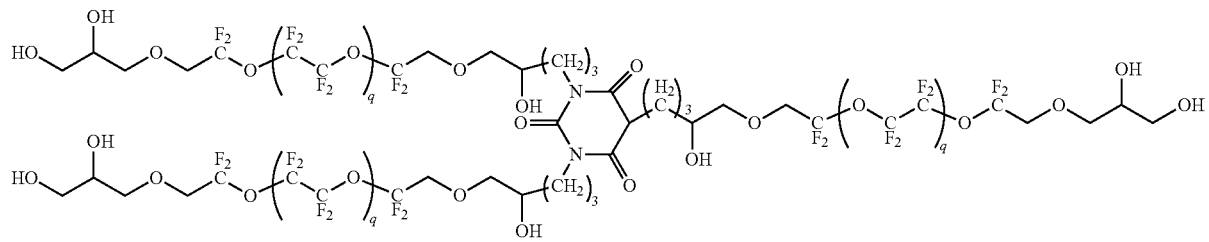

(in the General Formula (34), q is an integer of 3 to 7).

[Chem. 18]

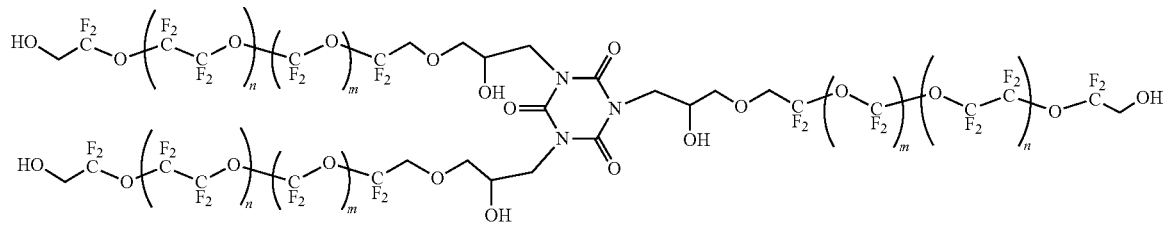

(35)

(in the General Formula 5), m is an integer of 2 to 5, and n is an integer of 2 to 5.)

Next, using the compounds 1-c, 1-d, 1-e_ 1-f, 2-a 2-b_ 2-c, 2-d, and 2-e synthesized in Example 2 to Example 10, in the same manner as in Example 1, the lubricating layer was formed on the magnetic recording medium, the silicone contamination resistance was evaluated, and an octacosane adhesion test was performed. The results are shown in Table 2.

COMPARATIVE EXAMPLE

Using the compound represented by the General Formula (24) (Fomblin Z-tetraol (with a molecular weight of about 2,000) commercially available from Solvey Solexis), in the same manner as in Example 1, the lubricating layer was formed on the magnetic recording medium, the silicone contamination resistance was evaluated, and an octacosane adhesion test was performed. The results are shown in Table 2.

TABLE 2

| | Film thick-ness (Å) | Silicone contamination resistance | | Octacosane adhesion test | |
| --- | --- | --- | --- | --- | --- |
| | | Time (hr) | Evaluation | Number of scattered light beams (number) | Evaluation |
| Example 1 | 10 | >500 | ○ | 88 | ○ |
| Example 2 | 11 | >500 | ○ | 70 | ○ |
| Example 3 | 10 | >500 | ○ | 90 | ○ |
| Example 4 | 11 | >500 | ○ | 68 | ○ |
| Example 5 | 9 | >500 | ○ | 75 | ○ |
| Example 6 | 10 | >500 | ○ | 82 | ○ |
| Example 7 | 11 | >500 | ○ | 73 | ○ |
| Example 8 | 10 | 450 | ○ | 110 | Δ |
| Example 9 | 11 | >500 | ○ | 98 | ○ |
| Example 10 | 10 | >500 | ○ | 91 | ○ |
| Comparative Example | 12 | 48 | x | 1,760 | x |

Based on the results shown in Table 2, it was found that, when the lubricating layer was formed on the protective layer of the magnetic recording medium using the compounds of Examples 1 to 10, the surface of the magnetic recording medium was covered with a higher coverage and the contamination resistance was more excellent than when the lubricating layer was formed using the compound of the comparative example.

In addition, the compound 1-b represented by the General Formula (26) in Example 1 corresponded to the lubricant used in the simulation number 15 shown in Table 1, the compound 1-c represented by the General Formula (27) in Example 2 corresponded to the lubricant used in the simulation number 16 shown in Table 1, the compound 1-d represented by the General Formula (28) in Example 3 corresponded to the lubricant used in the simulation number 17 shown in Table 1, the compound 2-b represented by the General Formula (32) in Example 7 corresponded to the lubricant used in the simulation number 19 shown in Table 1, and the compound of the comparative example corresponded to the lubricant used in the simulation number 20 shown in Table 1.

It was confirmed that the results of Example 1, Example 2, Example 3, Example 7, and the comparative example, and the results of the simulation number 15, the simulation number 16, the simulation number 17, the simulation number 19, and the simulation number 20 were well correlated and simulation results were highly reliable.

INDUSTRIAL APPLICABILITY

When the lubricant for a magnetic recording medium of the present invention is used, it is possible to form a lubricating layer that can cover the surface of the protective layer of the magnetic recording medium with a high coverage, even if the thickness thereof is thin.

REFERENCE SIGNS LIST

10 Magnetic recording medium
11 Substrate
12 Adhesion layer
13 Soft magnetic layer
14 First underlayer
15 Second underlayer
16 Magnetic layer
17 Protective layer
18 Lubricating layer
20 Protective layer
21 Cyclic siloxane
30 Nitrogen atom
31 Carbon atom
1a Lubricant
1b Lubricating layer

The invention claimed is:

1. A fluorine-containing ether compound represented by the following General Formula (1):

[Chem. 1]

  (1)

(in the General Formula (1), X is a trivalent atom or a trivalent atom group represented by any one of the following General Formula (9) to (23), (9)
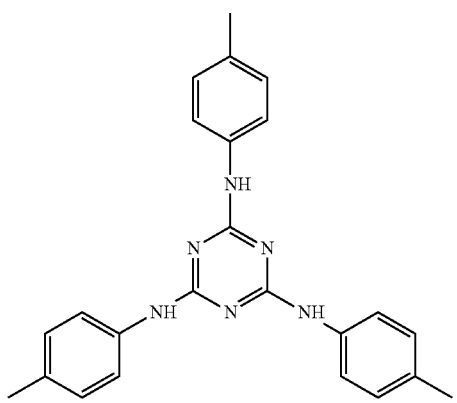
(10)
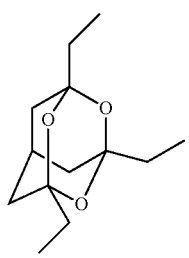
(11)
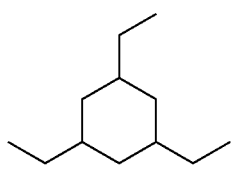
(12)
(13)
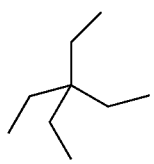
(14)
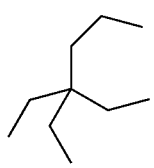
(15)
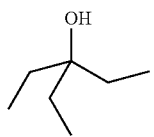
(16)
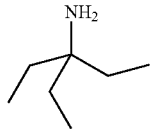
-continued
(17)
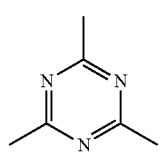
(18)
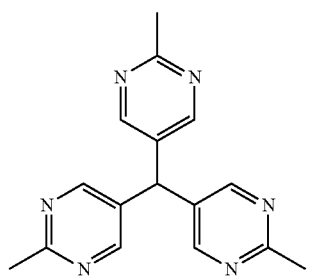
(19)
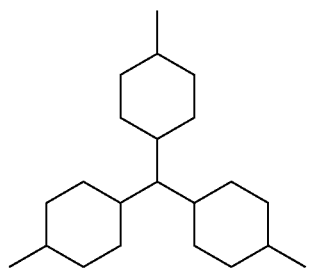
(20)
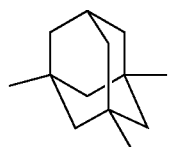
(21)
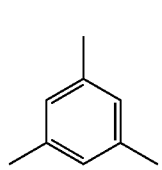
(22)
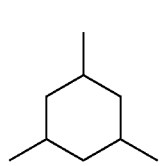
(23)
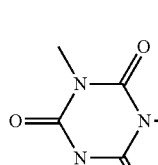
A is a linking group including at least one hydroxyl group represented by any one of the following General Formula (2) to General Formula (4):

[Chem. 2]

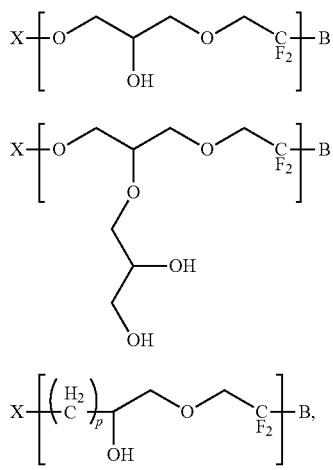

(in the General Formula (4), p is an integer of 1 to 5), B is a linking group having a perfluoropolyether chain, and D is a polar group or a substituent having a polar group at the end, wherein the polar group included in D is selected from a hydroxyl group, a carboxyl group, an amino group, and an aminocarboxyl group).

2. The fluorine-containing ether compound according to claim 1,
wherein B in the General Formula (1) is a linking group represented by the following General Formula (5) or the following General Formula (6):

[Chem. 3]

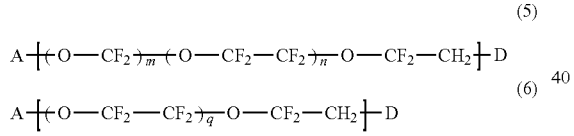

(in the General Formula (5), m is an integer of 1 to 30 and n is an integer of 1 to 30), (in the General Formula (6), q is an integer of 1 to 30).

3. The fluorine-containing ether compound according to claim 1,
wherein D in the General Formula (1) represents a hydroxyl group or any of the following General Formulae (7-1) to (7-3):

[Chem. 4]

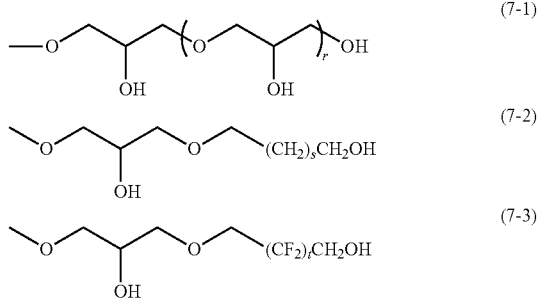

(in the General Formula (7-1), r is an integer of 0 to 5), (in the General Formula (7-2), s is an integer of 0 to 5), (in the General Formula (7-3), t is an integer of 1 to 5).

4. The fluorine-containing ether compound according to claim 1, wherein the number-average molecular weight is in a range of 1,000 to 10,000.

5. A lubricant for a magnetic recording medium comprising the fluorine-containing ether compound according to claim 1.

6. A magnetic recording medium in which at least a magnetic layer, a protective layer, and a lubricating layer are sequentially provided on a substrate,
wherein the lubricating layer contains the fluorine-containing ether compound according to claim 1.

7. The magnetic recording medium according to claim 6, wherein the average film thickness of the lubricating layer is 0.5 nm to 3 nm.

* * * * *